US012640912B2

(12) United States Patent
Rennich et al.

(10) Patent No.: US 12,640,912 B2
(45) Date of Patent: May 26, 2026

(54) UTILIZING A DEVICE USER KEY FOR ACCESS TO THIRD-PARTY APPLICATIONS

(71) Applicant: JumpCloud, Inc., Louisville, CO (US)

(72) Inventors: Joel William Rennich, West Lakeland, MN (US); Matthew Bradley Slocum, Broomfield, CO (US); Charles Walter Pinkerton, III, Boulder, CO (US)

(73) Assignee: JumpCloud, Inc., Louisville, CO (US)

( * ) Notice: Subject to any disclaimer, the term of this patent is extended or adjusted under 35 U.S.C. 154(b) by 185 days.

(21) Appl. No.: 18/733,694

(22) Filed: Jun. 4, 2024

(65) Prior Publication Data

US 2025/0070961 A1      Feb. 27, 2025

Related U.S. Application Data

(63) Continuation-in-part of application No. 18/545,917, filed on Dec. 19, 2023, now Pat. No. 12,463,798.

(60) Provisional application No. 63/549,791, filed on Feb. 5, 2024, provisional application No. 63/578,620, filed on Aug. 24, 2023.

(51) Int. Cl.
| | |
|---|---|
| *H04L 9/08* | (2006.01) |
| *H04L 9/32* | (2006.01) |
| *H04L 67/63* | (2022.01) |

(52) U.S. Cl.
CPC .......... *H04L 9/0825* (2013.01); *H04L 9/3226* (2013.01); *H04L 67/63* (2022.05)

(58) Field of Classification Search
CPC ..... H04L 9/0825; H04L 9/3226; H04L 67/63; H04L 9/3247
See application file for complete search history.

(56) References Cited

U.S. PATENT DOCUMENTS

| | | | | |
|---|---|---|---|---|
| 10,574,653 | B1 * | 2/2020 | Karppanen | .............. G06F 21/52 |
| 11,595,215 | B1 * | 2/2023 | Madden | .............. H04L 63/0807 |
| 2013/0339740 | A1 | 12/2013 | Ben-Shalom et al. | |
| 2016/0359843 | A1 * | 12/2016 | Candelore | .......... H04N 21/4367 |

(Continued)

FOREIGN PATENT DOCUMENTS

| | | |
|---|---|---|
| EP | 2254304 A2 | 11/2010 |
| WO | 2022/140469 A1 | 6/2022 |

OTHER PUBLICATIONS

"Partial International Search Report & Invitation to Pay Additional Fees," issued in connection with Int'l Appl. No. PCT/US2024/038876, dated Oct. 21, 2024 (10 pages).

*Primary Examiner* — Darren B Schwartz
(74) *Attorney, Agent, or Firm* — Holland & Hart LLP

(57) ABSTRACT

A request associated with accessing resources of the second party may be received at a first agent installed on a device for a first party, the being received from a second agent installed on the device for a second party. Based on the request, a signed access request that includes a refresh token previously obtained from a service of the resource management system (RMS) may be sent to the service of the RMS. The signed access request may be signed by a private key of the device. Also, a public key of the device corresponding to the private key may be registered with the service of the RMS. In response to sending the signed access request, a session token associated with accessing the resources of the second through the second agent may be received by the first agent from the service of the RMS.

20 Claims, 10 Drawing Sheets

(56) References Cited

U.S. PATENT DOCUMENTS

| | | | |
|---|---|---|---|
| 2019/0068377 A1* | 2/2019 | Matsugashita | ........ H04L 63/062 |
| 2021/0281576 A1* | 9/2021 | Shravan | ................. H04L 63/20 |

* cited by examiner

Figure 9:
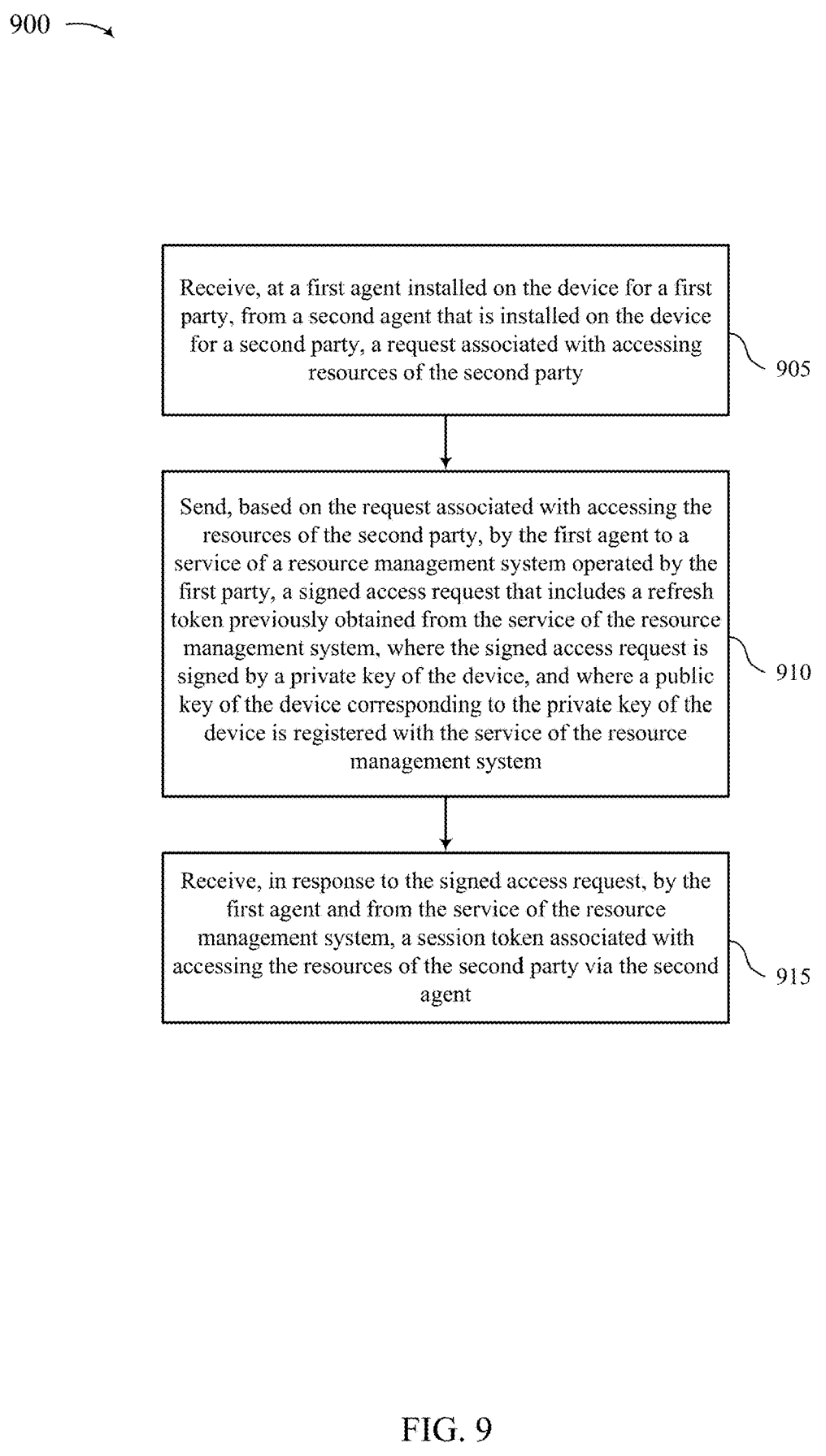

Receive, at a first agent installed on the device for a first party, from a second agent that is installed on the device for a second party, a request associated with accessing resources of the second party ⟍ 905

Send, based on the request associated with accessing the resources of the second party, by the first agent to a service of a resource management system operated by the first party, a signed access request that includes a refresh token previously obtained from the service of the resource management system, where the signed access request is signed by a private key of the device, and where a public key of the device corresponding to the private key of the device is registered with the service of the resource management system ⟍ 910

Receive, in response to the signed access request, by the first agent and from the service of the resource management system, a session token associated with accessing the resources of the second party via the second agent ⟍ 915

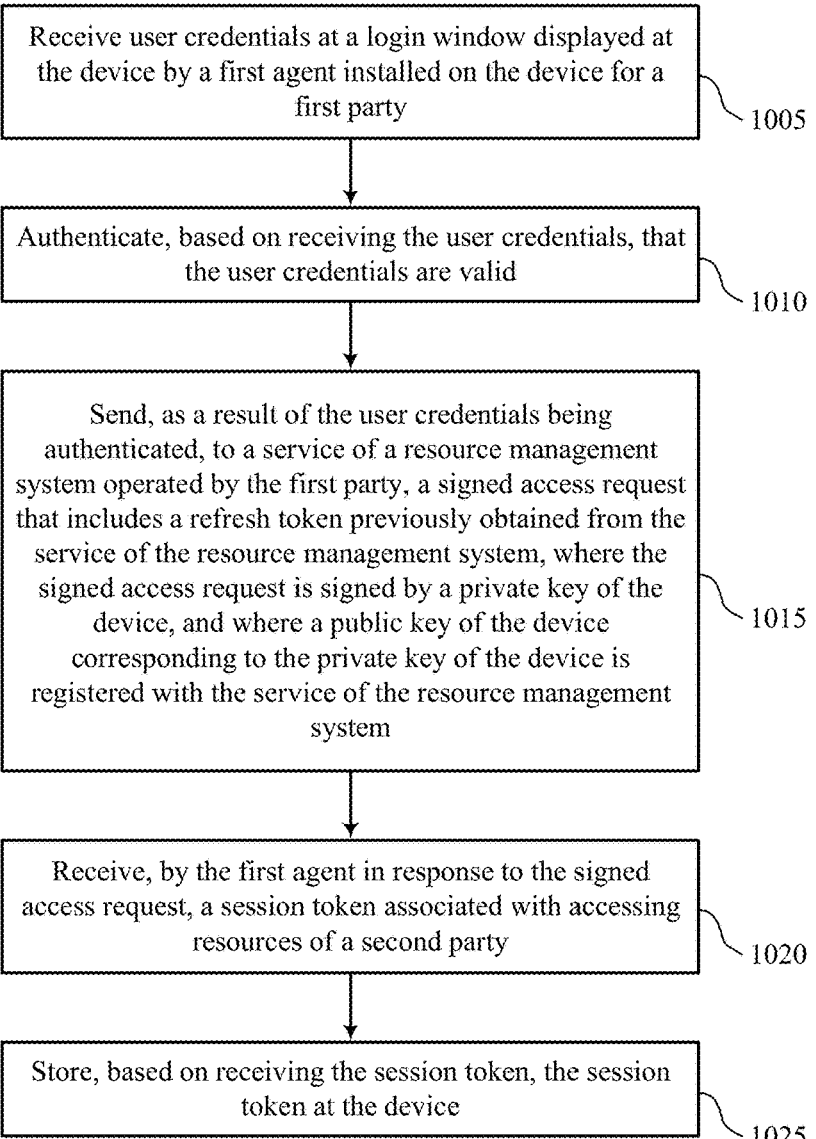

Receive user credentials at a login window displayed at the device by a first agent installed on the device for a first party ⟍ 1005

Authenticate, based on receiving the user credentials, that the user credentials are valid ⟍ 1010

Send, as a result of the user credentials being authenticated, to a service of a resource management system operated by the first party, a signed access request that includes a refresh token previously obtained from the service of the resource management system, where the signed access request is signed by a private key of the device, and where a public key of the device corresponding to the private key of the device is registered with the service of the resource management system ⟍ 1015

Receive, by the first agent in response to the signed access request, a session token associated with accessing resources of a second party ⟍ 1020

Store, based on receiving the session token, the session token at the device ⟍ 1025

FIG. 10

UTILIZING A DEVICE USER KEY FOR ACCESS TO THIRD-PARTY APPLICATIONS

CROSS REFERENCE

The present application for patent is a continuation-in-part of U.S. patent application Ser. No. 18/545,917, by REN-NICH et al., entitled "REGISTERING AND UTILIZING A DEVICE USER KEY," filed Dec. 19, 2023, which claims the benefit of U.S. Provisional Patent Application No. 63/578,620 by RENNICH et al., entitled "OBTAINING A SESSION USING A DEVICE USER KEY," filed Aug. 24, 2023, each of which are assigned to the assignee hereof and expressly incorporated by reference herein. The present application for patent also claims the benefit of U.S. Provisional Patent Application No. 63/549,791 by RENNICH et al., entitled "UTILIZING A DEVICE USER KEY FOR ACCESS TO THIRD-PARTY APPLICATIONS," filed Feb. 5, 2024, which is assigned to the assignee hereof and expressly incorporated by reference herein.

TECHNICAL FIELD

The present disclosure relates generally to resource management, including techniques for utilizing a device user key for access to third-party applications.

BACKGROUND

An organization (e.g., a company, enterprise, etc.) may manage, operate, and/or have access to numerous remote and local servers as part of its information technology (IT) system. The servers in the IT system may be used for hosting, storing, and distributing software applications, business documents, entertainment files (e.g., audio and video files), webpages, and the like. The servers in the IT system may be located on premises, located off premises (e.g., within remote data centers), hosted by a third-party (e.g., in "the cloud"). The organization may also manage, operate, and/or have access to numerous remote and local devices as part of its IT system. The devices (e.g., computers, phones, tablets, printers, etc.) in the IT system may be used to run applications, access aspects of the IT system, and serve other productivity functions. As new devices and servers are brought online and old devices and servers are decommissioned, IT systems tend to be constantly changing, and, as a result, managing IT systems may be time consuming, labor intensive, and tedious.

Resource management systems may facilitate the management of, operation of, and access to a wide variety of system resources (including local servers, remote servers, cloud-based servers, etc.) in an IT system. Resource management systems may also facilitate the management of, operation of, and access to user resources, including physical user devices (e.g., laptops, desktops, phones, tablets, etc.) and virtual user devices (e.g., virtual machines). User resources may be under the control of a user that is in possession of the user resource. In some examples, a user resource may be owned by the user, and software associated with the organization (e.g., mobile device management (MDM) software) may be used to manage operations aspects of the user resource. Accordingly, user resources may be scattered throughout a geographic environment. For example, certain user resources may be located within an internal IT network, while other user resources may be located outside an internal IT network. Also, positions of user resources may be constantly (relative to system resources) changing. For example, certain user resources may constantly (e.g., on a daily basis) join and leave an internal IT network. In some examples, user resources that are outside an internal IT network may gain access to the internal IT network using a virtual public network service.

Managing and supporting the operation of user resources may include installing software on user resources, setting system-level configurations (e.g., password requirements, default permissions, etc.) for user resources, controlling access of users to particular software and user services, controlling access of users to user resources, internal resources, third-party software and third-party services, and the like. Centralized and consistent application of IT policy across system resources, user resources, and users is imperative to achieving an IT system that functions efficiently and predictably.

BRIEF DESCRIPTION OF THE DRAWINGS

FIG. 5 shows an example of a set of operations for utilizing a device user key for access to third-party applications in accordance with examples disclosed herein.

FIGS. 9 and 10 show flowcharts illustrating methods that support utilizing a device user key for access to third-party applications in accordance with aspects of the present disclosure.

DETAILED DESCRIPTION

Relying solely on a certificate that uniquely identifies a device (e.g., a device certificate, mobile device management (MDM) certificate, etc.) to provide a device access to a service may be agnostic to a user of the device. Similarly, relying solely on an ID token certificate to provide a user access to a service may be agnostic to the device. That is, individually, neither the device certificate nor the ID token may identify a unique device/user combination. Moreover, relying on just one of a device certification or an ID token for authorizing initial and continued access may leave a device or user vulnerable to fraudulent acts (e.g., phishing schemes, man-in-the-middle attacks, etc.) as these pieces of information are communicated across internal and external networks. Thus, mechanisms that support providing initial and continued access to services based on unique device/user combinations while increasing security may be desired.

To support providing initial and continued access to services based on unique device/user combinations while increasing security, a trust anchor of a device (e.g., a device certificate, an MDM certificate, etc.), a trust anchor for a user (e.g., an ID token) stored at the device, and a public/private key pair (which may be referred to as a device key pair) generated at the device may be used to register a unique identifier of the device and user (which may also be referred to as a unique device/user identifier) at an RMS. The RMS may use the unique device/user identifier to support the initial and continued access of a device/user combination to services.

In some examples, the RMS may provide a device with a refresh token after registering, at the RMS, a unique device/user identifier for the device and a particular user of the device. The device may subsequently use the refresh token to gain access to resources (e.g., applications on the device, external resources, etc.). In some examples, (e.g., based on the particular user requesting access to a resource), the device may use the refresh token to obtain a session token from the RMS, which provides the device with access (e.g., temporary access) to the resource. In some examples, the device may use the refresh token to gain access to an external resource that is accessible via an application (e.g., a virtual private network application) installed on the device for the external resource. In some examples, to streamline the process for obtaining a session token, a device may proactively and autonomously retrieve one or more session tokens for gaining access to one or more resources after the particular user successfully logs in to the device.

Figure 1:
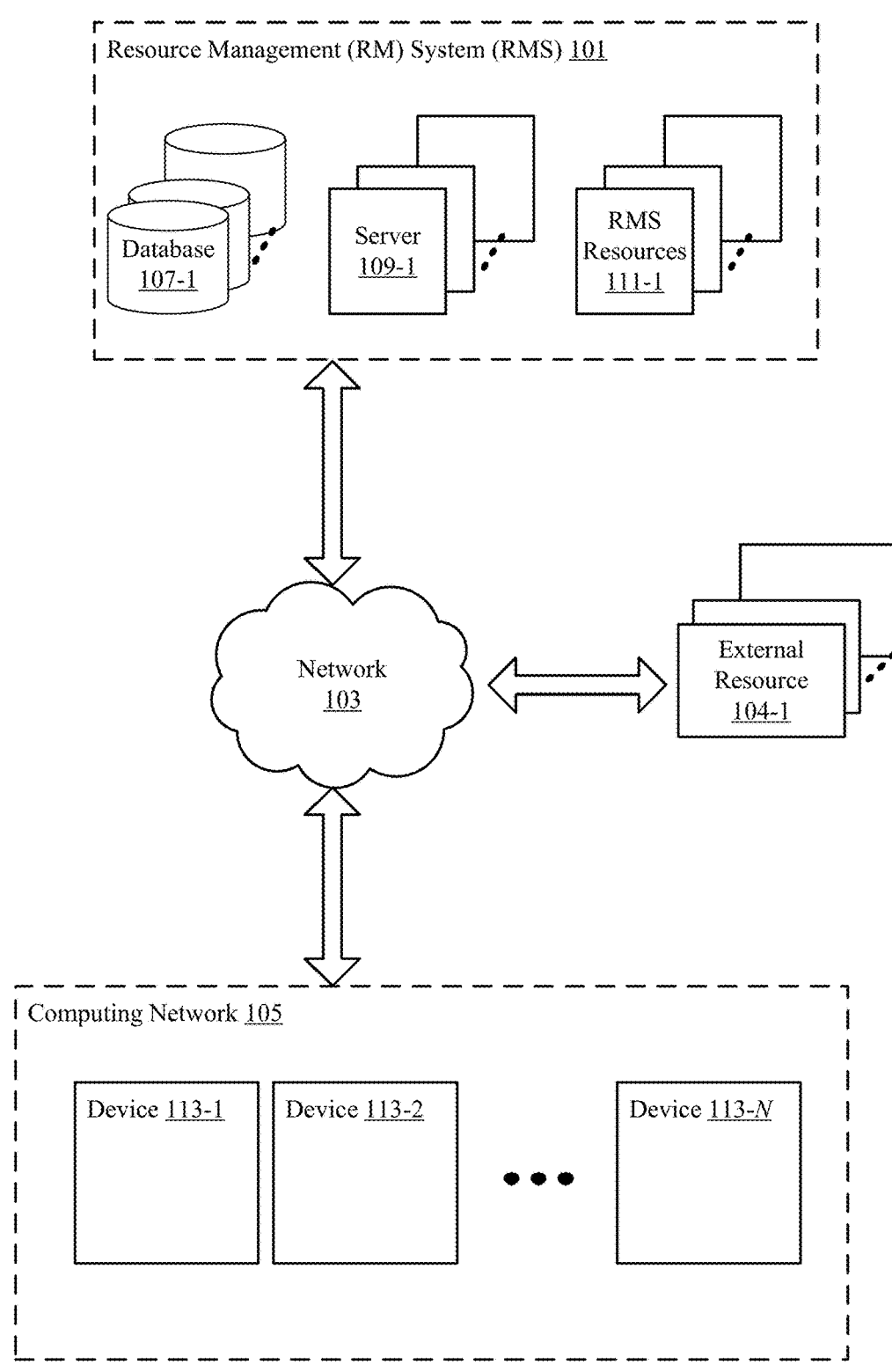
FIG. 1 shows an example of a computing environment that supports utilizing a device user key for access to third-party applications in accordance with examples disclosed herein.

FIG. 1 shows an example of a computing environment that supports utilizing a device user key for access to third-party applications in accordance with examples disclosed herein.

The computing environment 100 may include a resource management system (RMS), such as the RMS 101, the network 103, one or more external resources (ER) managed by one or more third-parties (e.g., the first external resource 104-1), and one or more computing networks (e.g., the computing network 105).

The RMS 101 may be configured to manage and support the operation of the computing network 105. For example, the RMS 101 may be configured to implement an information technology (IT) policy across one or more resources (e.g., the devices 113) within the computing network 105. The RMS 101 may also be configured to implement and apply IT policy for users of the computing network 105—e.g., the RMS 101 may govern access of users to particular resources, to particular information (e.g., network drives, folders, files, etc.), particular resources (e.g., internal resources, external resources, internal services, external services, etc.), and the like. In some examples, the RMS 101 may provide a centralized location for adding, modifying, or deleting resources, resource configurations, resource permissions, users, user information, user permissions, and the like. In some examples, the RMS 101 may be configured to store resource and user information, such as resource identity, an Internet Protocol (IP) address of a resource, authentication information of a user, a personal information of a user, and the like.

The RMS 101 may include one or more databases (e.g., the first database 107-1), one or more servers (e.g., the server 109-1), one or more RMS resources (e.g., the first RMS resource 111-1), or any combination thereof, which may be used to support (e.g., implement, provide storage for, etc.) the services offered by the RMS 101. The one or more RMS resources may be implemented as physical machines, containers, or virtual machines. In some examples, the one or more databases are implemented using one or more servers, one or more RMS resources, or a combination thereof.

The network 103 may include both private, public, and shared networking infrastructure. For example, the network 103 may include portions of networking infrastructure included within the computing network 105, portions of networking infrastructure included within the RMS 101, or both. Also, the network 103 may include network infrastructure external to both the RMS 101 and the computing network 105 that may be operated by external operators (e.g., Internet service providers (ISPs), cellular providers, satellite providers, etc.) and is used to connect resources together (e.g., digital subscriber line (DSL) networks, cable networks, fiber optic networks, cellular networks, satellite networks, etc.).

The computing network 105 may include one or more resources (e.g., the first device 113-1 through the Nth device 113-N) as well as networking infrastructure to connect the one or more resources to one another, to external networks, and the like. The devices 113 may include system-level devices (e.g., servers, databases, etc.) and user devices (e.g., laptops, desktops, phones, tablets, virtual machines, etc.). In some examples, the system-level devices of the computing network may be located on a premises of, or otherwise under the control of, an operator of the computing network 105. The user devices may be on-premises, off-premises, or may transition between being on and off-premises. For example, a laptop may be brought on premises during business hours and taken off premises outside of business hours. In another example, a laptop may be located primarily off-premises (e.g., if used for remote work). The system-level and user devices may be physical machines or virtual machines.

The external resources (e.g., the first external resource 104-1) may include virtual machines, websites, databases, file servers, web-based applications, web-based services, web-based computing resources, and the like. For example, the external resources may include Salesforce, Microsoft 365, Google Drive, Zoom, Microsoft Azure, and the like. In some examples, the external resources may be implemented using infrastructure that is separate from the infrastructure of the RMS 101, the infrastructure of the computing network 105, or both. In some examples, the infrastructure used to implement the external resources is managed by a different party than the party that controls the RMS 101. In some examples, the infrastructure used to implement the external resources is managed by a different party than the party that controls the computing network 105.

In some examples, the RMS 101 is configured to provide a single sign-on functionality that enables a user to access permitted information and services after an initial authentication of the user is performed (e.g., as part of a logon to a device, as part of a logon to a service managed by the RMS 101, etc.). Additionally, or alternatively, the RMS 101 may be configured to maintain access of the user (e.g., by issuing a token) to an accessed service for a duration of time (e.g., which may be subject to a refresh policy), enabling a user to leave and return to the service without reauthenticating.

As noted herein, the RMS 101 may be configured to manage devices within the computing network 105. For example, the RMS 101 may be configured to manage user devices within the computing network 105—e.g., set login policies, set access policies for the device to resources within the computing network 105, etc. As part of managing devices, the RMS 101 may enroll a device at the RMS 101 (e.g., via an agent (which may also be referred to as a client) of the RMS 101 that is installed on the device). Based on enrolling the device, the RMS 101 may issue, to the agent of the RMS 101, a certificate that uniquely identifies the device (which may be referred to as a "device certificate"). In other examples, as part of managing user devices, the RMS 101 may implement a mobile device management (MDM) policy at a user device. As part of implementing an MDM policy for a specific user device (e.g., the first device 113-1), the RMS 101 may generate an MDM certificate at the user device that uniquely identifies the user device to the RMS 101 and that may be used to vouch for the identity of the device. Accordingly, when interacting with and implementing policy at the user device, the RMS 101 may confirm, using the MDM certificate stored at the user device and related information stored at the RMS 101, the identity of the user device—e.g., to confirm that the user device is indeed the expected device while implementing policy for the user device. In some examples, the RMS 101 may consider the MDM certificate to be a "trust anchor" or "device trust anchor" for the user device. That is, the MDM certificate may be considered a reliable factor for verifying that the user device is the device that the user device purports to be.

The RMS 101 may be configured to manage users associated with the computing network 105. For example, the RMS 101 may be configured to authorize users for access to certain devices, certain services, certain information, and the like. In some examples, the RMS 101 may be configured to authorize a user to access a particular user device (e.g., the first device 113-1). As part of authorizing a user to access the user device, the RMS 101 may support a flow (e.g., an OpenID flow) for verifying the identity of the user and may return an identity (ID) token that identifies the user and that may be used to vouch for the identity of the user. Accordingly, when interacting with and implementing policy for the user, the RMS 101 may confirm, using the ID token stored at the user device, the identity of the user of the device—e.g., to confirm that the user is indeed the user that the user purports to be. In some examples, the RMS 101 may consider the ID token to be a "trust anchor" or a "user trust anchor" for the user.

In some examples, the RMS 101 may use a certificate that uniquely identifies a device (e.g., a device certificate, an MDM certificate) to authorize a device for initial and continued (e.g., persisted) access to a service. In some examples, the RMS 101 may use an ID token to authorize a user for initial and continued access to a service.

However, relying solely on a certificate that uniquely identifies a device (e.g., a device certificate, mobile device management (MDM) certificate, etc.) to provide a device access to a service may be agnostic to a user of the device. Similarly, relying solely on an ID token certificate to provide a user access to a service may be agnostic to the device. That is, individually, neither the device certificate nor the ID token may identify a unique device/user combination. Moreover, relying on just one of a device certification or an ID token for authorizing initial and continued access may leave a device or user vulnerable to fraudulent acts (e.g., phishing schemes, man-in-the-middle attacks, etc.) as these pieces of information are communicated across internal and external networks. Thus, mechanisms (e.g., methods, systems, apparatuses, techniques, configurations, components) that support providing initial and continued access to services based on unique device/user combinations while increasing security may be desired.

To support providing initial and continued access to services based on unique device/user combinations while increasing security, a trust anchor of a device (e.g., a device certificate, an MDM certificate, etc.), a trust anchor for a user (e.g., an ID token) stored at the device, and a public/private key pair (which may be referred to as a device key pair) generated at the device may be used to register a unique identifier of the device and user (which may also be referred to as a unique device/user identifier) at an RMS. The RMS may use the unique device/user identifier to support the initial and continued access of a device/user combination to services.

In some examples, the first device 113-1 may register, at the RMS 101, a unique device/user identifier to a particular device/user combination. To register a unique device/user identifier, the first device 113-1 may obtain a trust anchor for the device (which may be referred to as a device trust anchor)—e.g., a device certificate, an MDM certificate. The first device 113-1 may also obtain a trust anchor for the user (which may be referred to as a user trust anchor)—e.g., an ID token obtained in an Open ID flow, a biometric, etc. And the first device 113-1 may generate a device public/private key pair. In some examples, the first device 113-1 may trigger a hardware-based cryptographic component that is permanently or semi-permanently fixed (e.g., soldered) to the first device 113-1 and may not be used at a different device (e.g., is non-portable) to generate the device key pair, which may be stored in the cryptographic component.

Based on generating the device key pair, the cryptographic component may further generate a unique identifier (which may be referred to as a device key identifier) of the device key pair. The device key identifier may be used by the cryptographic component to identify and access the device key pair when needed. After obtaining the device trust anchor, the user trust anchor, and the device key pair, the first device 113-1 may send, to the RMS 101, a registration message that includes the device trust anchor, the user trust anchor, and the public key of the device key pair (which may be referred to as the device public key). In some examples, first device 113-1 includes the device public key and the user trust anchor in the payload of the registration message and signs the registration message with the device trust anchor.

The RMS 101 (which may be in possession of the device trust anchor and the user trust anchor) may use the device trust anchor and the user trust anchor to verify and validate the registration message. In some examples, the RMS 101 may be in possession of the device trust anchor and the user trust anchor based on itself generating and issuing the underlying information After verifying and validating the registration message, the RMS 101 may register the device public key to the device/user combination that corresponds to the device trust anchor and the user trust anchor. Registering the device public key to the device/user combination may include storing the device public key and an association between the device public key and the device/user combination in the first database 107-1. Thus, the device public key may be used to identify a unique device/user pair for future operations (e.g., future authentication operations). Based on being registered to a specific device/user combination, the device public key may be referred to as a device user key (DUK). In some examples, after successfully registering the DUK to the device/user combination, the RMS 101 may generate a single-use token that identifies the device/user combination, which may be referred to as a device user refresh token (DURT). The RMS 101 may generate and store a key identifier (which may be referred to as a DURT key identifier) for the DURT and may send the DURT to the first device 113-1. In some examples, a DUK that is registered at the RMS 101 for a particular device/user combination and the DURT may be used together to provide a user initial and continued access to a third-party agent installed on the device.

In some examples, an agent of the RMS 101 installed on the first device 113-1 may receive, from an agent of the first external resource 104-1 installed on the first device 113-1, a request associated with accessing resources of the second party (e.g., via a virtual private network connection). In some examples, the agent of the RMS 101 receives the request based on a user of the first device 113-1 attempting to gain access to an application of the first external resource 104-1 installed on the first device. Based on receiving the request, the agent of the RMS 101 may send, to a service hosted by the RMS 101, a signed access request that includes a DURT that was previously obtained from the service hosted by the RMS 101. The signed access request may be signed by a private key of the first device 113-1. Also, a public key of the first device 113-1 corresponding to the private key may be registered with the service of the RMS 101. In response to sending the signed access request, the agent of the RMS 101 may receive, from the service of the RMS 101, a DUST associated with accessing the resources of the third-party through the agent of the first external resource 104-1. Based on receiving the DUST, the agent of the RMS 101 may send the DUST to the agent of the first external resource 104-1, and the agent of the first external resource 104-1 may send the DUST to the first external resource 104-1. Based on receiving the DUST (in some examples, in coordination with a service of the RMS 101), the first external resource 104-1 may grant the device access to resources of the first external resource 104-1—e.g., via a virtual private network connection.

By registering the device public key to the unique device/user combination, a device private key that is stored at (and known only to) the device may be used to authorize the device for subsequent access to resources and/or services, including resources and/or services that are accessible through third-party applications installed on the device— e.g., based on using the device private key to obtain a refresh token, session token, or both.

In some examples, the first device 113-1 may receive user credentials at a login window displayed at the first device 113-1 by an agent of the RMS 101 installed on the first device 113-1. Based on receiving the credentials, the agent of the RMS 101 may authenticate that the user credentials are valid. Based on authenticating the credentials as valid, the agent of the RMS 101 may send a signed access request to a service (e.g., a token service) of the RMS 101. The signed access request may include a DURT previously obtained from the service of the RMS 101 and may be signed by a private key of the first device 113-1. A public key of the first device 113-1 corresponding to the private key may be registered with the service of the RMS 101. Based on sending the signed access request, the agent of the RMS 101 may receive a DUST (e.g., from the service of the RMS 101) associated with access resources of one or more resources (e.g., the first external resource 104-1, an application on the first device 113-1, etc.). The agent of the RMS 101 may store the DUST at the first device 113-1. After storing the DUST, the first device 113-1 may request access to another resource (e.g., via another agent installed on the first device 113-1, via a browser, etc.). Based on requesting access to the resource, the first device 113-1 may use the already obtained DUST (rather than executing a procedure for obtaining a DUST) to obtain access to the resource.

By autonomously retrieving a DUST upon a login event, during a subsequent request for access to another resource, a device may be able to immediately use a retrieved DUST for obtaining accessing to the resource, rather than first performing a procedure for obtaining a DUST that can be used to obtain access to the resource.

Figure 2:
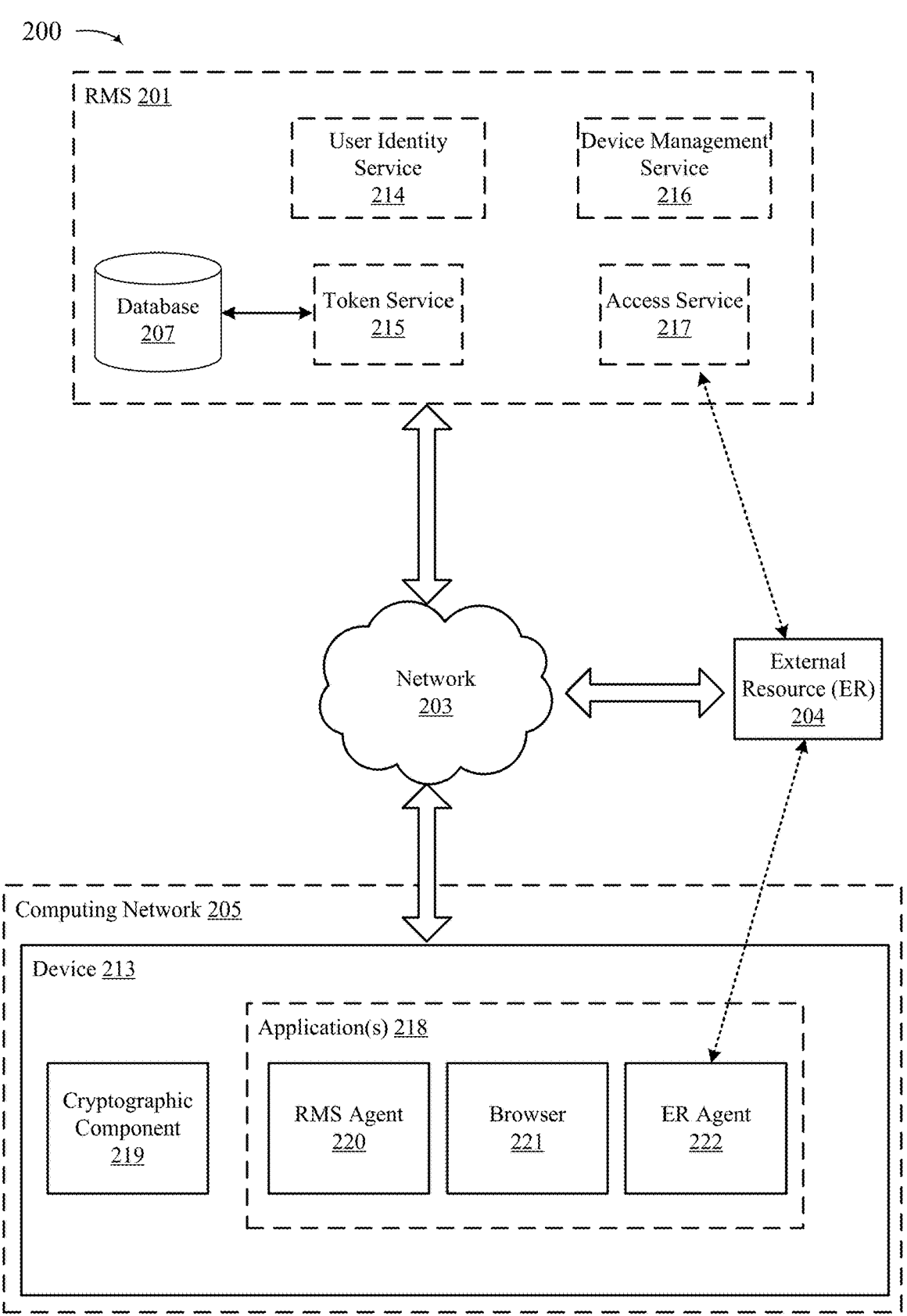
FIG. 2 shows an example of a subsystem that supports utilizing a device user key for access to third-party applications in accordance with examples disclosed herein.

FIG. 2 shows an example of a subsystem that supports utilizing a device user key for access to third-party applications in accordance with examples disclosed herein.

The subsystem 200 may include the RMS 201, the network 203, the external resource 204, and the computing network 205, which may be respective examples of an RMS (e.g., the RMS 101 of FIG. 1) a network (e.g., the network 103 of FIG. 1), an external resource (e.g., the first external resource 104-1 of FIG. 1), and a computing network (e.g., the computing network 105 of FIG. 1) described herein.

The RMS 201 may include the database 207, which may be an example of a database (e.g., the first database 107-1 of FIG. 1) described herein. The RMS 201 may also include the user identity service 214, the token service 215, the device management service 216, and the access service 217.

The user identity service 214 may be configured to store and verify identities of users (which may include personal information, authentication information, location information, etc.). The user identity service 214 may be configured to participate in an OpenID flow and may issue an identity token that uniquely identifies a user after the user is verified.

The device management service 216 may be configured to store and verify identities of devices (which may include device type information, location information, etc.). In some examples, the device management service 216 may also be configured to store configurations for particular devices (e.g., in accordance with a mobile device management policy) and may be further configured to implement configurations at particular devices. In some examples, the device management service 216 may be configured to issue a certificate that uniquely identifies a device based on completing an enrollment process for a device via an agent of the RMS 201 that is installed on the device.

The token service 215 may be configured to execute the operations for registering device public keys to unique device/user combinations. The token service 215 may be further configured to execute the operations for generating and delivering tokens (e.g., refresh tokens and session tokens) that support providing a user access to services, such as the external resource 204. For example, at a first time, the token service 215 may be configured to generate a DURT based on a DUK that is stored at the database 207 and registered to the device 213 (which may be an example of a device described herein (e.g., the first device 113-1 of FIG. 1) and a current user of the device 213. The token service 215 may be further configured to deliver the DURT to the device 213 via the network 203. Also, at a subsequent time associated with a request to access the external resource 204, the token service 215 may be configured to generate a DUST based on receiving the DURT from the device 213 via the network 203. The token service 215 may be further configured to deliver the DUST to the device 213 via the network 203.

The database 207 may configured to store device public keys that have been registered to a device/user combination as DUKs. The database 207 may be configured to store associations (e.g., mappings, links, etc.) between the stored DUKs and the device/user combinations.

The access service 217 may be configured to provide a user access to services, such as the external resource 204. The access service 217 may be configured to authorize a user of a device (e.g., the device 213) to access a service (e.g., the external resource 204) based on a token (e.g., a session token) that was previously obtained at the device 213 from the token service 215. In some examples, the access service 217 is configured to implement a portal that enables a user to access aspects (e.g., a GUI, a user portal, etc.) of the RMS 201.

The device 213 may include applications 218 and a cryptographic component 219.

The applications 218 may be configured to perform functions at the device 213. The applications 218 may include a browser 221, an RMS agent 220 (that is an agent of the RMS 201), an ER agent 222 (which may also be referred to as an ER client), an application configured to enroll a device with the RMS 201 (e.g., which may be implemented as, or as part of, the RMS agent 220), an application configured to implement an MDM policy obtained in an MDM policy file (e.g., which may be implemented as, or as part of, the RMS agent 220), an application to obtain an ID Token (e.g., which may be implemented as, or as part of, the RMS agent 220), an application for receiving authentication credentials for a user to log in to the device 213 (e.g., which may be implemented as, or as part of, the RMS agent 220), an application for receiving authentication credentials for a user to log in to a portal of the RMS 201 (e.g., which may be implemented as, or as part of, the RMS agent 220), an application for supporting the registration and utilization of a DUK (e.g., which may be implemented as, or as part of, the RMS agent 220), and the like.

The browser 221 may be an Internet browser (e.g., Chrome, Firefox, Internet Explorer, Edge, etc.). The browser 221 may provide a user a graphical access to Internet and other browser-based services. In some examples, the browser 221 supports continued user access to a service—e.g., based on storing cookies, tokens, or both, within the browser 221. The browser 221 may include an extension that supports the registration and utilization of a DUK. In some examples, the extension may be used to access (e.g., via a Native Message Host functionality of the extension) the RMS agent 220 (which may be referred to as the DURT agent) to support the registration and utilization of a DUK. In some examples, the extension may be configured to initiate and terminate operation of the RMS agent 220.

The ER agent 222 may be an agent of the external resource 204. The ER agent 22 may provide a user access, via the device 213, to resources hosted by the external resource 204. In some examples, the ER agent 222 may establish a connection (e.g., a VPN connection) to the external resource 204, and the external resource 204 may provide a user access to resources at the external resource 204 based on the connection being established—e.g., as though traffic from the device 213 originates within a network that includes the external resource 204.

The cryptographic component 219 may be used to store secrets at the device 213 (e.g., certificates, key pairs, etc.). In some examples, the cryptographic component 219 is implemented within a dedicated cryptographic integrated circuit that is located on the device 213 and that can only be accessed by the device 213. That is, the cryptographic integrated circuit may not be moved from the device 213 to another device and, even if the cryptographic integrated circuit is moved to another device, it may be inaccessible. In some examples, the cryptographic component 219 is a dedicated hardware integrated circuit that is permanently (e.g., extremely difficult, or impossible, to be removed from the device 213 without damage) or semi-permanently (e.g., soldered) fixed to the device 213. Accordingly, private keys stored in the cryptographic component 219 may be known only to the device 213 and may be accessible to the device 213 to the exclusion of all others, including the computing network 205 and the RMS 201. In some examples, the cryptographic component 219 is implemented using Apple's Secure Enclave or Microsoft's Trusted Platform Module (TPM).

Figure 3:
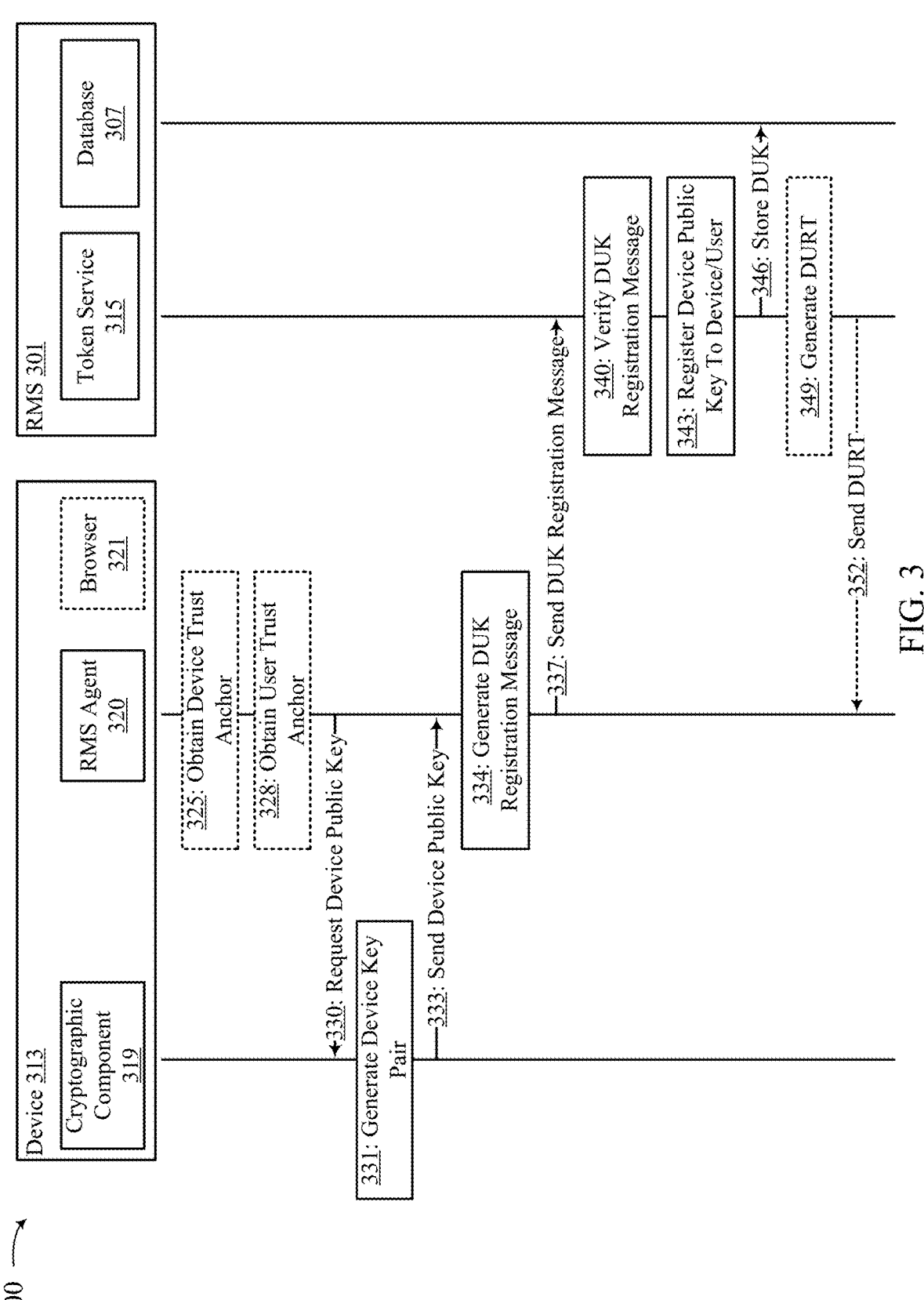
FIG. 3 shows an example of a set of operations for utilizing a device user key for access to third-party applications in accordance with examples disclosed herein.

FIG. 3 shows an example of a set of operations for utilizing a device user key for access to third-party applications in accordance with examples disclosed herein.

The process flow 300 may be performed by the device 313, the RMS 301, and the external resource 304, which may be respective examples of a device (e.g., one or more of the devices 113 of FIG. 1, the device 213 of FIG. 2), an RMS (e.g., the RMS 101 of FIG. 1, the RMS 201 of FIG. 2) described herein. In some examples, the process flow 300 shows an example set of operations performed to support utilizing a device user key for access to third-party applications. For example, the process flow 300 may include operations for registering, at an RMS, a DUK to a unique device/user combination. And may further include operations for obtaining a DUST based on registering the DUK.

At 325, a device trust anchor may be obtained for the device 313. The device trust anchor may include information that can be used to verify, with high certainty, that a device is indeed the particular device that the device purports to be. In some examples, an application installed at the device 313 (e.g., the RMS agent 320 of the RMS 301) enrolls a device with the RMS 301 and receives a certificate that uniquely identifies the device upon successful enrollment. In some examples, an application installed at the device 313 (e.g., the RMS agent 320 of the RMS 301) obtains an MDM certificate as the device trust anchor. The application may obtain the MDM certificate as part of an MDM procedure or after an MDM procedure is completed (e.g., from storage). In some examples, the application obtains a serial number of the device 313 as the trust anchor—e.g., if the serial number of the device 313 is stored at a web-accessible location, the RMS 301, or the like.

At 328, a user trust anchor may be obtained for a user that is currently accessing the device 313. The user trust anchor may include information that can be used to verify, with high certainty, that a user is indeed the particular user that the user purports to be. In some examples, an application installed at the device 313 (e.g., the RMS agent 320 of the RMS 301) obtains an ID token as the user trust anchor. The application may obtain the ID token as part of performing an Open ID flow with the RMS. In some examples, the application obtains personal or biometric information of the user as the user trust anchor—e.g., if the biometric information of the user is stored at a web-accessible location, the RMS 301, or the like.

At 330, a device public key may be requested. The RMS agent 320 may request the device public key based on obtaining the device trust anchor and the user trust anchor. In some examples, the RMS agent 320 obtains the device trust anchor, the user trust anchor, and requests the device public key based on a user initiated at the device 313 a process for registering a DUK at the RMS.

At 331, a device key pair may be generated at the device—e.g., in response to the request from the RMS agent 320. The cryptographic component 319 may generate the device key pair. In some examples, the cryptographic component 319 generates the device key pair in response to a request received from the RMS agent 320. The device key pair may be associated with the device/user combination of the device 313 and the current user of the device 313—e.g., based on the current user of the device 313 initiating the generation of the device key pair—e.g., based on the user logging into the device 313, user logging into the RMS 301, and the like. Based on generating the device key pair, the cryptographic component 319 may generate a device key identifier that identifies the device key pair for subsequent access.

At 333, the device public key may be sent to the RMS agent 320. In some examples, a device key identifier for the corresponding device key pair may also be sent to the RMS agent 320.

At 334, a DUK registration message may be generated. The RMS agent 320 may generate the message using the device trust anchor, the user trust anchor, and the device public key of the device key pair. In some examples, to generate the registration message, the RMS agent 320 includes the user trust anchor (e.g., the ID token) and the device public key in the registration message and signs the registration message with the device trust anchor (e.g., the device certificate, the MDM certificate). The RMS agent 320 may also include device key identifier associated with the device key pair in the registration message.

In some examples, the registration message is structured as follows.

```
Header {
    alg: Certificate Algorithm.
    kid: Key ID - Unique ID for the client to identify the device key pair (e.g., in
the TPM/SE).
    typ: Type - JavaScript Object Notation (JSON) web token (JWT)
    x5c: Certificate Chain.
}
Body {
    duk: JSON web key (JWK) (string) - Device Public Key.
    system: Object_ID (objectID).
    token: idToken (string).
}
```

At 337, the DUK registration message may be sent to the RMS 301. In some examples, the RMS agent 320 sends the DUK registration message directly to the RMS 301 via an API of the RMS 301. The API of the RMS 301 may be referred to as a DURT API. In some examples, the token service 315 supports the operation of the DURT API. In other examples, the RMS agent 320 sends the DUK registration message to the RMS 301 via the browser 321—e.g., via an extension of the browser 321 that interfaces with the RMS agent 320 (e.g., using a native messaging service) and the API of the RMS 301. The DUK registration message may be received at the token service 315.

At 340, the DUK registration message may be verified. The token service 315 may verify that the value of the user trust anchor (e.g., the ID token) matches the value of the user trust anchor possessed (e.g., stored) by the token service 315. The token service 315 may further check that the DUK registration message has not been altered by verifying that the received DUK registration message was signed by the device trust anchor (e.g., the device certificate, the MDM certificate)—using the device trust anchor possessed by the token service 315.

At 343, based on verifying the user trust anchor and confirming that the DUK registration message has not been altered, the token service 315 may register, as a DUK, the device public key received in the DUK message to the device/user combination that corresponds to the device trust anchor and the user trust anchor indicated in the DUK message.

By registering the device public key as the DUK for the device/user combination, a mechanism that is cryptographically rooted within (and cannot be transferred out of) the device 313 itself may be used to uniquely identify and verify a device/user combination for future operations, and without sharing secret information (e.g., the device private key) with another party (not even the RMS 301). Moreover, by maintaining the secret information at the device 313 itself, security measures at the device 313 (e.g., biometrics) may be used to provide access to the secret information.

At 346, based on registering the DUK to the device/user combination, the DUK may be stored. The token service 315 may store the DUK in the database 307. In some examples, based on registering the DUK, the token service 315 may store an association (e.g., a mapping, a link, a code corresponding to the user/device, etc.) between the DUK and the device/user combination. In some examples, based on registering the DUK, the token service 315 may store an identifier for the DUK, which may correspond to the device key identifier stored at the device 313 for the device key pair.

At 349, based on registering the DUK, a DURT may be generated—e.g., as a random collection of letters and numbers. In some examples, the DURT may be generated automatically in response to the DUK being registered. In some examples, the DURT may be associated with the device/user combination—e.g., by associating the DURT with the DUK. In some examples, the DURT, the association between the DURT and the DUK, or both, may be stored in the database 307. In some examples, the token service 315 may generate a DURT key identifier for the DURT and may store the DURT key identifier in the database 307—e.g., with the DURT.

In some examples, the DURT may indicate a security level associated with obtaining the DURT—e.g., by indicating one or more authentication methods that were used to obtain the DURT. In some examples, if the DUK registration was initiated based on a user logging into the device 313, the DURT may indicate that a password was used to obtain the DURT. In some examples, if the DUK registration was initiated based on a user logging into the device 313 and providing a biometric (e.g., fingerprint, face scan, etc.), the DURT may indicate that a password and biometric was used to obtain the DURT. In some examples, if the DUK registration was initiated based on a user logging into the RMS 301 and accepting a push notification, the DURT may indicate that a password and push challenge was used to obtain the DURT.

By indicating the authentication measures used to obtain the DURT, the authentication measures (including authentication measures provided by the device 313 itself) may be integrated into the DURT and used for subsequent operations. For example, when the device 313 requests access to a service that requires biometric verification of the user, the DURT may be used to verify that a user had to be authenticated with a biometric to obtain the DURT, which may be acceptable to the service. By integrating, into the DURT, authentication operations (e.g., biometrics) inputted directly into the device 313, procedure for obtaining certain authentication measures (e.g., biometrics) for accessing a service may be simplified—e.g., relative to performing a separate procedure, separate hardware, or both, for obtaining this information.

The DURT may be a single-use token. The DURT token may expire if not periodically refreshed, if used within a duration, or both. In some examples, the DURT may expire if it is not refreshed within a recurring period (e.g., every fourteen (14) days) that restarts from the last refresh. In some examples, the DURT may expire if a user does not provide an authentication factor (e.g., a biometric) within a recurring period (e.g., every 8 hours), at a recurring event (e.g., sign-on), or both. In some examples, the DURT may expire if not used within a duration (e.g., 90 days), regardless of whether the DURT is being periodically refreshed.

In some examples, the DURT message is structured as follows.

```
{
    aud:     Audience - The DURT API.
    exp:     Expiration (time code) - Epoch DURT expires.
    iat:     Issued At (time code) - Epoch DURT was minted.
    iss:     Issuer - GUID of the registration. ID for the client.
    kid:     Key ID - Unique ID for the client to identify the device key pair (e.g., the
TPM/SE).
    rat:     Requested At (time code) - Epoch this refresh chain started. Enables
refresh ability.
    sub:     Subject - User email of user associated with DUK.
    org:     OrganizationID.
    amr:     Authentication Method References - Array of strings that represent factors
used during user authentication. Selected from one or more of password, push, time-based
one-time password (TOTP), text, call, biometric, etc.
    system:  SystemID.
}
```

An example DURT message generated in accordance with the above DURT message structure is as follows.

```
{
    aud:     https://dt.hostname.com/      //e.g., hostname of the token service 315.
    exp:     1677008108.
    iat:     1675798508.
    iss:     afoij3a-234j-0af9-aflkje-aneolcpe2i93ja0.
    kid:     awoSECIkdfsjoake-29dfjafDa_AKejifeal2DAF82=.
    rat:     1675445569.
    sub:     username@hostname.com,      //username for user associated with
DURT.
    org:     308sfad689adfffe35.
    amr:     ["password", "push"].
    system:  123abc.
}
```

In some examples, the token service 315 may sign the DURT using a secret or private key held by the token service 315—a corresponding public key may be used to verify the signature of the private key.

At 352, the DURT may be sent to the device 313. In some examples, the token service 315 sends the DURT directly to the RMS agent 320 via an API of the RMS 301. In some examples, the token service 315 sends the DURT to the RMS agent 320 via the browser 321—e.g., via an extension of the browser 321 that interfaces with the RMS agent 320 and the API of the RMS 301. In some examples, the DURT may be received at the browser 321 and, in some examples, routed to the RMS agent 320. In other examples, the DURT may be received at the RMS agent 320.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

Figure 4:
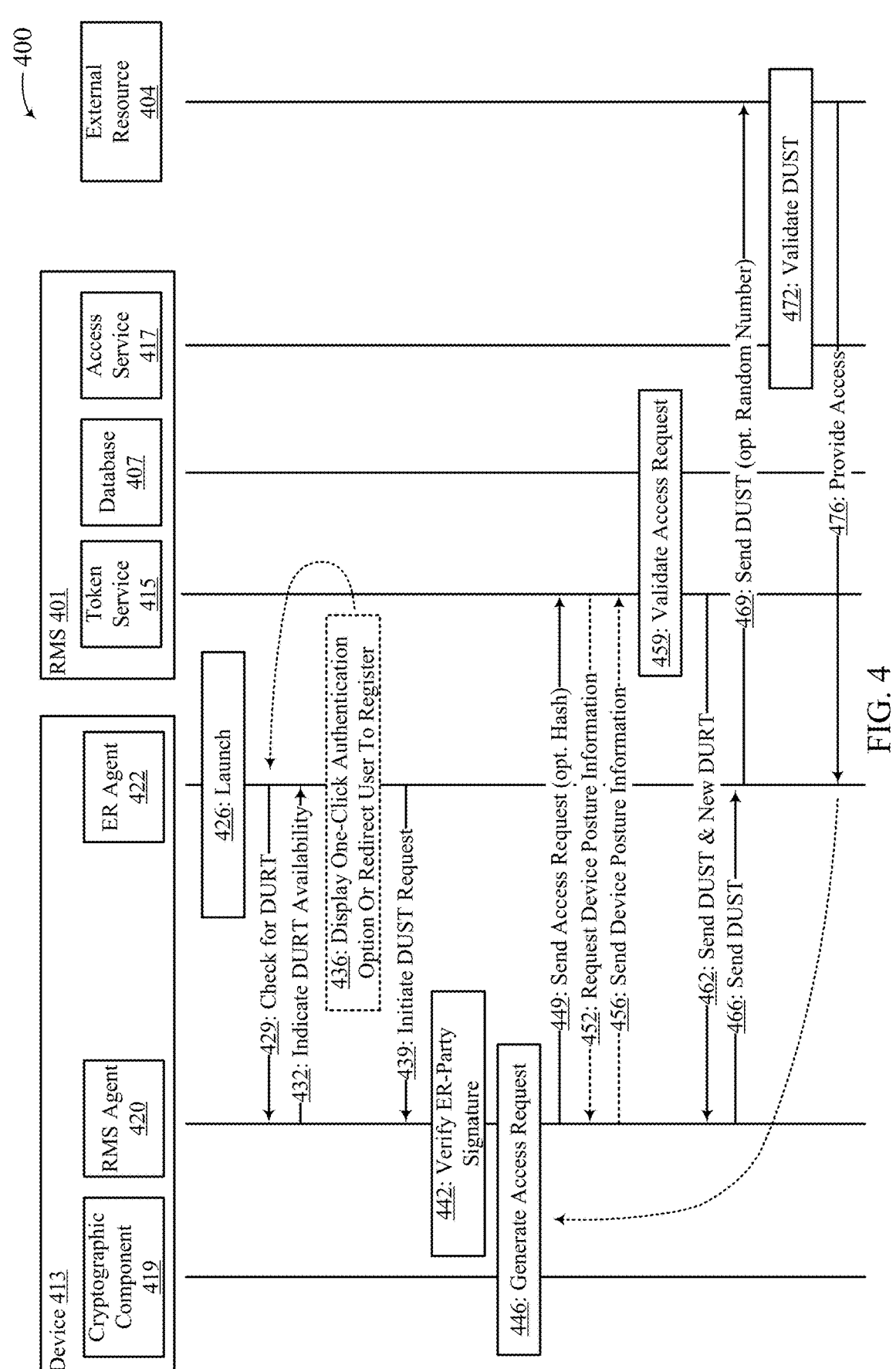
FIG. 4 shows an example of a set of operations for utilizing a device user key for access to third-party applications in accordance with examples disclosed herein.

FIG. 4 shows an example of a set of operations for utilizing a device user key for access to third-party applications in accordance with examples disclosed herein.

The process flow 400 may be performed by the device 413, the RMS 401, and the external resource 404, which may be respective examples of a device (e.g., the one or more devices 113 of FIG. 1, the device 213 of FIG. 2, the device 313 of FIG. 3), an RMS (e.g., the RMS 101 of FIG. 1, the RMS 201 of FIG. 2, the RMS 301 of FIG. 3), and an external resource (e.g., the first external resource 104-1 of FIG. 1, the external resource 204 of FIG. 2) described herein. In some examples, the process flow 400 shows an example set of operations performed to support utilizing a device user key for access to third-party applications. For example, the process flow 400 may include operations for utilizing a DUK that is registered at an RMS and a DURT obtained using the DUK to obtain a session token (e.g., a DUST), where the DUST may be provided to an agent of an external resource managed by a third-party, which may use the DUST to establish a connection to the external resource.

At 426, the ER agent 422 (installed on the device 413) may be launched—e.g., based on being selected by a user of the device 413.

At 429, based on being launched, an operation for determining whether the device 413 is storing a valid DURT for a current user of the device 413 attempting to gain access to the external resource 404 may be performed. In some examples, the ER agent 422 may send a message to the RMS agent 420 (e.g., via a native messaging service, a binary for the RMS agent 420, etc.) to determine whether a DURT is stored for the current user. In some examples, the ER agent 422 starts the RMS agent 420 based on being triggered into operation—e.g., causes the device 413 to initiate a process that supports the operation of the RMS agent 420.

At 432, in response to the message from the ER agent 422, an indication of whether a valid DURT is stored for the current user of the device 413 may be sent to the ER agent 422. In some examples, the RMS agent 420 sends a response indicating that a valid DURT is stored for the current user of the device 413. In some examples, the RMS agent 420 may also send data associated with the user in the response—e.g., a name of the user, an email address of the user, a picture of the user, etc. In other examples, the RMS agent 420 sends a response indicating that no DURT (or no valid DURT, e.g., an expired DURT) is stored for the current user of the device 413.

At 436, based on receiving an indication that a valid DURT is stored for the current user of the device 413, a one-click authentication option may be displayed to the user. In some examples, the browser extension causes the browser 421 to display the one-click authentication option. The one-click authentication option may be a button that includes a picture of the user, a name of the user, an email address of the user, or any combination thereof.

In some examples, rather than display a one-click authentication option, the ER agent 422 may proceed with initiating a procedure for gaining the current user access to the external resource 404 without any further input from the current user.

Based on receiving an indication that no valid DURT is stored for the current user of the device 413, the ER agent 422 may direct the user to register a DUK with the RMS 401 to obtain a DURT. In some examples, the ER agent 412 may display an alert window suggesting the current user register the DUK (e.g., as similarly described herein, including with to confirm an identity of, and obtain an identity token for, the current user of the device 413). In some examples, the ER agent 412 may trigger the RMS agent 420 to initiate a DUK registration for the combination of the device 413 and the current user of the device 413. In some examples, based on being triggered to initiate the DUK registration, the RMS agent 420 may guide a user through a set of operations for obtaining a device certificate, an identity token, or both, before generating and registering a DUK for the combination of the device 413 and the current user of the device 413 with the RMS 401. After registering a DUK with the RMS 401, a DURT may be received at the RMS agent 420, and the ER agent 422 may again check whether the device 413 is storing a valid DURT for a current user of the device 413.

At 439, a procedure for requesting a DUST (using the valid DURT stored at the device 413) may be initiated. In some examples, the ER agent 422 may send a message to the RMS agent 420 that causes the RMS agent 420 to initiate the DUST request procedure. In some examples, the ER agent 422 may sign the DUST request with a private key of a third-party that manages the external resource 404.

At 442, a signature of the third-party may be verified by the RMS agent 420—e.g., using a corresponding public key stored at the RMS agent 420 for the third-party.

At 446, an access request may be generated (e.g., by the RMS agent 420) based on verification that a signature on the received DUST request corresponds to the third-party. The access request may be used to request a DUST from the RMS 401. In some examples, the cryptographic component 419 and the RMS agent 420 collectively generate the access request. To generate the access request, the RMS agent 420 may include the DURT in the payload of the access request.

In some examples, to generate the access request, the RMS agent 420 may also generate a string of random characters (e.g., a string of random number, a string of random alphanumericals, etc.) and compute a hash of the string of random characters. The string of random characters may be stored in the memory (e.g., the random-access memory) of the device 413. In such cases, the RMS agent 420 may include both the DURT and the hash of the string of random characters in the payload of the access request.

In some examples, the access request is structured as follows.

```
{
    type AccessReq struct {
        // Standard JWT Claims.
        aud:        Audience.
        exp:        Expiration (time code) - Epoch DURT expires.
        iat:        Issued At (time code) - Epoch DURT was minted.
        iss:        Issuer.
        sub:        Subject. Same as Issuer.
        // Client Cred Claims.
        jti:        JSON Token ID - Unique.
        kid:        Key ID - Key identifier used to register the DURT.
        // Special Claims.
        durt:       DURT.
        nonce:      Nonce.
        challenge:      Hash of string of random characters. Used by target resource to
    prevent interception of the DUST.
    }
}
``` reference to the operations described in FIG. 3), which may require the user to sign into a portal of the RMS 401 (e.g., An example access request message generated in accordance with the above access request structure is as follows.

```
{
    aud:         https://dt.hostname.com/,    //e.g., hostname of the token service 415.
    exp:         1675807218.
    iat:         1675806918.
    iss:         afoij3a-234j-0af9-aflkje-aneolcpe2i93ja0.
    jti:         Pafe923ssEJFFS202423dsj.
    kid:         awoSECIkdfsjoake-29dfjafDa_AKejifeal2DAF82=.
    sub:         afoij3a-234j-0af9-aflkje-aneolcpe2193ja0.
    challenge:   cdisasfo3A9aDalaDPeAd92fs3fjSklkds354.
    durt:
        asfjoe938sJKe2389uHidhfwei38IDJ38dhjIDKeifslop8932r98fjh89uHidhfJ38dhjID9
        uHidhfwe9uHidhfwewei38IDJ38dhjID2389uHidhfwei38IDJ38dKe2389uHidhfwei
        38IDJ38dhjIDKeifslop8932r98fjh89uHidhei38IDJ38dhjID23Hidhfwei38IDJ38dhjI
        DKeifslop8932r98fjh89uHidhfJ38dhjID9uHidhfwe9uHidhfwewei38IDJ38dhjID23
        89uH8dhjID23.
}
```

After generating the payload of the access request, the RMS agent 420 may send the payload to the cryptographic component 419, and the cryptographic component 419 may sign the payload using the device private key that corresponds to the DUK stored at the RMS 401 for the combination of the device 413 and the current user of the device 413—the device public key may be used to verify the signature of the device private key.

At 449, the access request may be sent to the RMS 401. In some examples, the RMS agent 420 sends the access request to the token service 415—e.g., using a DURT API supported by the token service 415.

At 452, device posture information for the device 413 may be requested (by the RMS 401) in response to the access request. In some examples, before validating an access request, issuing a DUST to the device 413, or both, the token service 415 may request information about the device 413 (e.g., a year the device 413 was manufactured; a type of the device 413 (e.g., desktop, laptop, tablet, or server); an operating system running on the device 413, a browser and version of the browser running on the device 413, whether the device 413 supports biometric authentication, whether the device 413 is running certain applications (e.g., CrowdStrike), and the like). In some examples, the token service 415 sends the device posture request based on a type of service that the current user of the device may gain access to—e.g., if the current user is requesting access to a sensitive service, such as a database that includes private user data.

The RMS agent 420 may collect the requested device posture information in response to the device posture information request. In some examples, the RMS agent 420 may cache the device posture request and, in some examples, the collected device posture information. In such cases, the RMS agent 420 may send the device posture information with future access requests—e.g., based on determining that the current user is requesting access to a sensitive service and without receiving an additional request from the token service 415.

In some examples, rather than the token service 415 sending the device posture request in response to a received access request, the content of the device posture request may be stored at the RMS agent 420—e.g., prior to the DUST request being initiated. In some examples, the content of device posture requests sent for different types of applications may be stored at the RMS agent 420. In such cases, the RMS agent 420 may send the device posture information with the access request sent to the token service 415—e.g., based on determining that the current user is requesting access to a sensitive service.

At 456, device posture information for the device 413 may be sent to the RMS 401 in response to the request for device posture information.

At 459, the access request may be validated—e.g., after any requested device posture information for the device 413 is verified as being sufficient for accessing the external resource. To validate the DURT, the token service 415 may confirm that the DURT is stored in the database 407. Additionally, or alternatively, to validate the access request, the token service 415 verifies that the DURT is signed by the device private key. Additionally, or alternatively, the token service 415 may also verify that the DURT is signed by a secret or private key held by the token service 415. Additionally, or alternatively, the token service 415 may verify that the issuer of the DURT and the issuer named in the access request match. Additionally, or alternatively, the token service 415 may confirm that the DURT has not expired. Additionally, or alternatively, the token service 415 may verify that the DURT key identifier stored at the database 407 matches the DURT key identifier included in the access request. Additionally, or alternatively, the token service 415 may verify that the DURT included in the access request is the latest DURT issued for the device/user combination—e.g., that a new DURT has not been issued for the device/user combination after the DURT included in the access request was issued.

By confirming that the DURT included in the access request is the latest issued DURT for the device/user combination, forking of the DURT chain may be prevented. That is, the token service 415 may be prevented from generating a new DURT from one or more previously issued DURTs that are still valid but superseded by the latest issued DURT.

The token service 415 may generate the DUST based on validating the access request. In some examples, the DUST may be associated with the device/user combination. In some examples, the DUST, the association between the DUST and the device/user combination, or both, may be stored in the database 407. In some examples, the token service 415 may generate a DUST key identifier for the DUST and may store the DUST key identifier in the database 407—e.g., with the DUST.

In some examples, the DUST may indicate a security level associated with obtaining the DUST—e.g., as similarly described herein, including with reference to the operations described at 349 of FIG. 3. In some examples, the DUST may indicate the same security level as the DURT. In other examples, the DUST may indicate a different (e.g., higher) security level than the DURT—e.g., if the user is required to complete an additional authentication operation, such as a push verification, to obtain the DUST.

The DUST may be a single-use token that provides the user access to the external resource 404 a single-time. In such cases, to maintain a session with the external resource (e.g., if the user leaves and returns to the service), aspects of the procedure for obtaining a DUST (e.g., beginning with the operations described at 446) may be repeated to verify the user is still authorized to access the external resource 404.

In some examples, the DUST message is structured as follows.

```
{
    aud:        Audience.
    exp:        Expiration (time code) - Epoch this token expires.
    iat:        Issued At (time code) - Epoch this token was minted.
    iss:        Issuer.
    sub:        Subject - User email.
    amr:        Authentication Method References - Array of strings that represent factors
used during user authentication. Selected from one or more of "password", "push", "TOTP",
"text", "call", "biometric", etc.
    challenge:  Used by target resource to prevent interception of the sessionToken.
    system:     SystemID.
    org:        OrganizationID.
}
```

An example DUST message generated in accordance with the above DUST message structure is as follows.

```
{
    aud:        https://acc.hostname.com/, //e.g., hostname of the access service 417.
    exp:        1675810137.
    iat:        1675810077.
    iss:        https://dt.hostname.com/    //e.g., hostname of the token service 415.
    sub:        username@hostname.com //username for user associated with
DUST.
    amr:        ["password", "push"].
    challenge:  cdisasfo3A9aDalaDPeAd92fs3fjSklkds354.
    system:     123abc.
    org:        308sfad689adfffe35.
}
```

In some examples, the token service 415 may sign the DUST using a secret or private key held by the token service 415—a corresponding public key may be used to verify the signature of the private key.

At 462, based on the access request being validated, the DUST and a new DURT may be sent to the device 413. In some examples, the DUST and the new DURT may be sent directly to the RMS agent 420.

At 466, the DUST and, in some examples, the string of random characters used to generate the hash of the string of random characters may be sent to the ER agent 422.

At 469, the DUST and, in some examples, the string of random characters may be sent to the external resource 404. In some examples, the ER agent 422 may sign the DUST with the private signature of the third-party that manages the external resource 404. In some examples, the ER agent 422 may also send device posture information for the device 413.

At 472, the DUST may be validated (e.g., by the external resource 404, the access service 417, or a combination thereof). In some examples, the external resource 404 may validate and process the message received from the ER agent 422. For example, the external resource 404 (e.g., a service at the external resource 404) may confirm that the received message has been signed by the ER agent 422 with a private key of a third-party that manages the external resource 404. In some examples, the external resource 404 may determine details related to the request and the current user of the device 413 that initiated the request. Based on these details, the external resource 404 may identify one or more network paths (associated with one or more services at the external resource 404) to open for the current user after a connection is established between the ER agent 422 and the external resource 404.

In some examples, after identifying that the current user of the device 413 has permissions to access services within the external resource 404, the external resource 404 may validate the DUST received in the message. In some examples, to validate the DUST, the external resource 404 may request a public key from the access service 417. In other examples, the public key may be cached at the external resource 404. Based on obtaining the public key, the external resource 404 may confirm that the DUST has been signed by a corresponding private key of the token service 415. Additionally, or alternatively, the access service 417 may complete the challenge embedded in the DUST using the plain-text string of random characters received with the DUST.

In some examples, based on validating the DUST, the external resource 404 may confirm that the authentication measures associated with the DUST (e.g., the authentication measures indicated in the DUST) comply with the security requirements of the external resource 404. For example, based on determining that a single factor of authentication used to obtain the DUST is sufficient for accessing the requested services of the external resource 404, the external resource 404 may validate the DUST based on extracting from the DUST an indication that a single factor of authentication was used to obtain the DUST.

In another example, the external resource 404 may determine that multiple factors of authentication (e.g., a password and push verification) are needed to access the requested services of the external resource 404. In some examples, based on determining, from the DUST, that the DUST was obtained using a single factor of authentication (e.g., a password), the external resource 404 may send the user a push verification prior to validating the DUST—to satisfy the higher security requirements for accessing the requested service.

In another example, the external resource 404 may determine that a biometric factor of authentication (e.g., a password and fingerprint) is needed to access the requested services of the external resource 404. In some examples, based on determining, from the DUST, that the DUST was obtained using a biometric factor (e.g., a fingerprint provided at the device 413 as part of an initial procedure for obtaining the DURT), the external resource 404 may validate the DUST.

At 476, access to the external resource 404 may be provided to the user based on the DUST being validated. In some examples, providing access to the external resource 404 may include establishing a VPN connection between the ER agent 422 and the external resource 404.

In some examples, the access to the external resource 404 may be continuously validated for the user. For example, periodically (e.g., every 15 minutes), the device 413 may generate a new access request to request a new DUST that enables the device/user combination to maintain access to the external resource 404 via the ER agent 422.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller, may cause the controller to perform the operations of the process flow 400.

One or more of the operations described in the process flow 400 may be performed earlier or later, omitted, replaced, supplemented, or combined with another operation. Also, additional operations described herein may replace, supplement or be combined with one or more of the operations described in the process flow 400.

Figure 5:
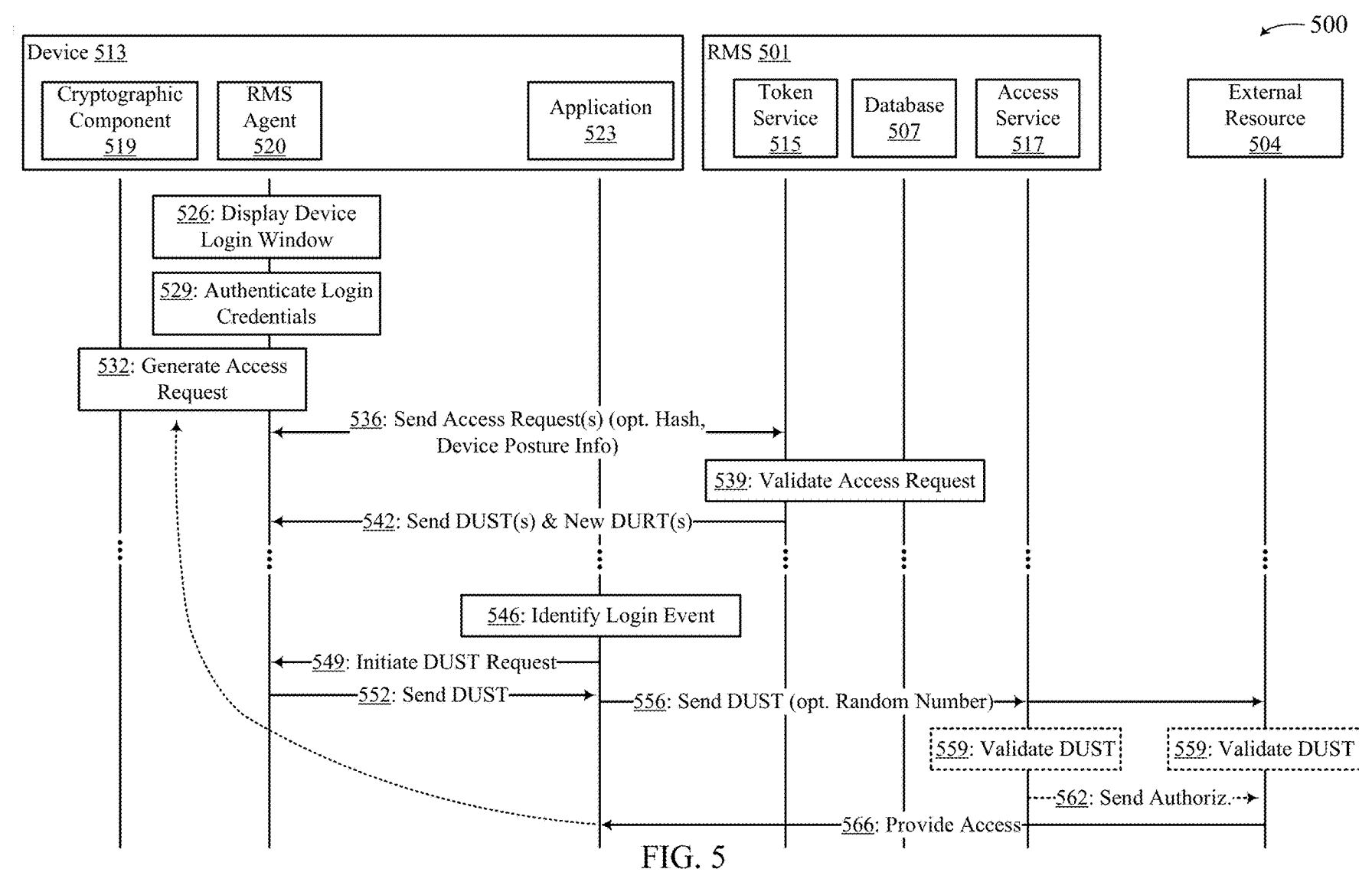

FIG. 5 shows an example of a device that supports utilizing a device user key for access to third-party applications in accordance with examples disclosed herein.

The process flow 500 may be performed by the device 513, the RMS 501, and the external resource 504, which may be respective examples of a device (e.g., the one or more devices 113 of FIG. 1, the device 213 of FIG. 2, the device 313 of FIG. 3, the device 413 of FIG. 4), an RMS (e.g., the RMS 101 of FIG. 1, the RMS 201 of FIG. 2, the RMS 301 of FIG. 3, the RMS 401 of FIG. 4), and an external resource (e.g., the first external resource 104-1 of FIG. 1, the external resource 204 of FIG. 2, the external resource 404 of FIG. 4) described herein. In some examples, the process flow 500 shows an example set of operations performed to support utilizing a device user key for access to third-party applications. For example, the process flow 500 may include operations for utilizing a DURT (obtained using a DUK that is registered at an RMS for a device) to autonomously obtain one or more session tokens (e.g., a DUST) that grants a device access to an external resource when a user logs into the device.

At 526, a login window may be displayed at the device 513. In some examples, the login window may be displayed by the RMS agent 520. The login window may be separate from a login window for the device supported by an operating system of the device 513 but may still provide a user access to the device 513. In some examples, to provide the user access to the device 513, the login service provided by the RMS agent 520 may interface with aspects of the operating system of the device 513.

At 529, credentials entered by the current user of the device may be authenticated by the device 513. In some examples, the generation of an access request may be autonomously triggered (e.g., by the RMS agent 520) once the login credentials inputting into the device 513 are authenticated.

At 532, the access request may be generated—e.g., as similarly described herein, including with reference to the operations described at 446 in FIG. 4. In some examples, multiple access requests may be generated, where the multiple access requests may be associated with multiple services provided by one or more internal resources, one or more external resources, or both. In some examples, an access request associated with a browser installed on the device 513 may be generated autonomously. Additionally, or alternatively, an access request associated with a third-party agent installed on the device 513 may be generated autonomously. In some examples, the access request(s) that are generated are based on a user profile, user preferences, or prior user behavior. For example, if a user consistently logs into a VPN agent on the device 513 after logging into the device 513, then the RMS agent 520 may autonomously generate an access request for the VPN agent—e.g., after the user logs into the VPN agent a threshold quantity of times, a threshold quantity of times within a duration, etc.).

In some examples, if the user/device combination for a user of the device 513 has not yet been registered, the RMS agent 520 may direct the user to register a DUK for the user-device combination with the RMS 501. In some examples, based on registering with the RMS 501, a DURT and a DUST may be received at the RMS agent 520.

At 536, the access request and, in some examples, device posture information may be exchanged between the RMS agent 520 and the token service 515—e.g., as similarly described herein, including with reference to the operations described at 449, 452, and 456 in FIG. 4.

At 539, the access request may be validated—e.g., as similarly described herein, including with reference to the operations described at 459 in FIG. 4.

At 542, one or more DUSTs and one or more new DURTs may be communicated—e.g., as similarly described herein, including with reference to the operations described at 462 in FIG. 4.

At 546, a login event may be detected (e.g., at the application 523). In some examples, the application 523 is a browser. In some examples, the application 523 is a VPN agent used to obtain access to the external resource 404. In some examples, the application 523 is a second VPN agent used to obtain access to a second external resource. In some examples, the login event may occur when a user accesses a login page for the external resource 504, where the login page may be provided via a browser installed on the device 513. In some examples, the login event may occur when a user launches a VPN agent that provides a connection to the external resource 504.

At 549, a DUST request may be initiated (e.g., by the application 523)—e.g., as similarly described herein, including with reference to the operations described at 439 of FIG. 4.

At 552, a DUST associated with the application 523 and obtained as a result of logging into the device 513 may be provided to the application 523 in response to the DUST request. That is, instead of performing an access request flow in response to the DUST request, the RMS agent 520 may directly provide the DUST to the application 523. In some examples, if the application 523 is a browser, the RMS agent 520 may provide a DUST associated with the browser. In some examples, if the application 523 is a VPN agent for the external resource 504, the RMS agent 520 may provide a different DUST associated with the external resource 504.

At 556, the DUST and, in some examples, a random number may be sent—e.g., as similarly described herein, including with reference to the operations described at 469 of FIG. 4. In some examples, the DUST may be sent directly to the external resource 504—e.g., if the application 523 is a VPN agent. In other examples, the DUST may be sent to the access service 517—e.g., if the application 523 is a browser.

At 559, the DUST may be validated (e.g., by the access service 517, the external resource 504, or a combination thereof)—e.g., as similarly described herein, including with reference to the operations described at 472 in FIG. 4.

At 562, authorization for the external resource to grant access to the user/device combination may be sent to the external resource (e.g., if the application 523 is a browser). In some examples, the access service 517 sends a security assertion markup language (SAML) message to the external resource 504 that indicates the user is authorized for access to the external resource 504.

At 566, access may be provided to the user—e.g., as similarly described herein, including with reference to the operations described at 476 in FIG. 4.

Figure 6:
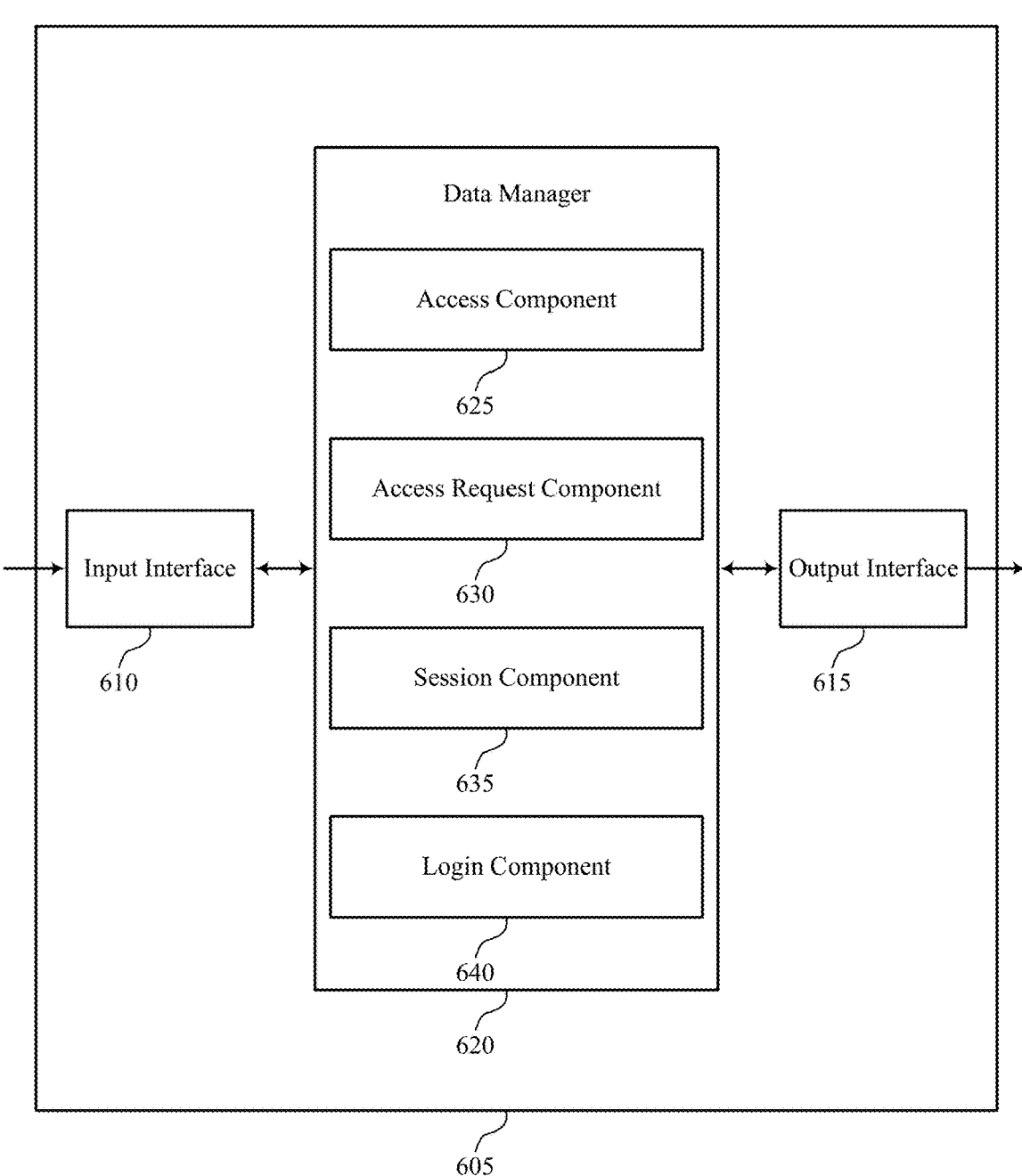
FIG. 6 shows a block diagram of an apparatus that supports utilizing a device user key for access to third-party applications in accordance with aspects of the present disclosure.

FIG. 6 shows a block diagram 600 of a system 605 that supports utilizing a device user key for access to third-party applications in accordance with aspects of the present disclosure. In some examples, the system 605 may be an example of aspects of one or more components described with reference to FIG. 1, such as a DMS 110. The system 605 may include an input interface 610, an output interface 615, and a data manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the data manager 620 to support utilizing a device user key for access to third-party applications. In some cases, the input interface 610 may be a component of a network interface 825 as described with reference to FIG. 8.

The output interface 615 may manage output signaling for the system 605. For example, the output interface 615 may receive signaling from other components of the system 605, such as the data manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the data manager 620 may include an access component 625, an access request component 630, a session component 635, a login component 640, or any combination thereof. In some examples, the data manager 620, or various components thereof, may be configured to perform various operations (e.g., receiving, monitoring, transmitting) using or otherwise in cooperation with the input interface 610, the output interface 615, or both. For example, the data manager 620 may receive information from the input interface 610, send information to the output interface 615, or be integrated in combination with the input interface 610, the output interface 615, or both to receive information, transmit information, or perform various other operations as described herein.

The access component 625 may be configured as or otherwise support a means for receiving, at a first agent (220) installed on the device for a first party, from a second agent (222) that is installed on the device for a second party, a request associated with accessing resources (104) of the second party. The access request component 630 may be configured as or otherwise support a means for sending, based on the request associated with accessing the resources of the second party, by the first agent to a service (215) of a resource management system (101) operated by the first party, a signed access request that includes a refresh token previously obtained from the service of the resource management system, where the signed access request is signed by a private key of the device, and where a public key of the device corresponding to the private key of the device is registered with the service of the resource management system. The session component 635 may be configured as or otherwise support a means for receiving, in response to the signed access request, by the first agent and from the service of the resource management system, a session token associated with accessing the resources of the second party via the second agent.

The login component 640 may be configured as or otherwise support a means for receiving user credentials at a login window displayed at the device by a first agent (220) installed on the device for a first party. The login component 640 may be configured as or otherwise support a means for authenticating, based on receiving the user credentials, that the user credentials are valid. The access request component 630 may be configured as or otherwise support a means for sending, as a result of the user credentials being authenticated, to a service (215) of a resource management system (101) operated by the first party, a signed access request that includes a refresh token previously obtained from the service of the resource management system, where the signed access request is signed by a private key of the device, and where a public key of the device corresponding to the private key of the device is registered with the service of the resource management system. The session component 635 may be configured as or otherwise support a means for receiving, by the first agent in response to the signed access request, a session token associated with accessing resources of a second party. The session component 635 may be configured as or otherwise support a means for storing, based on receiving the session token, the session token at the device.

Figure 7:
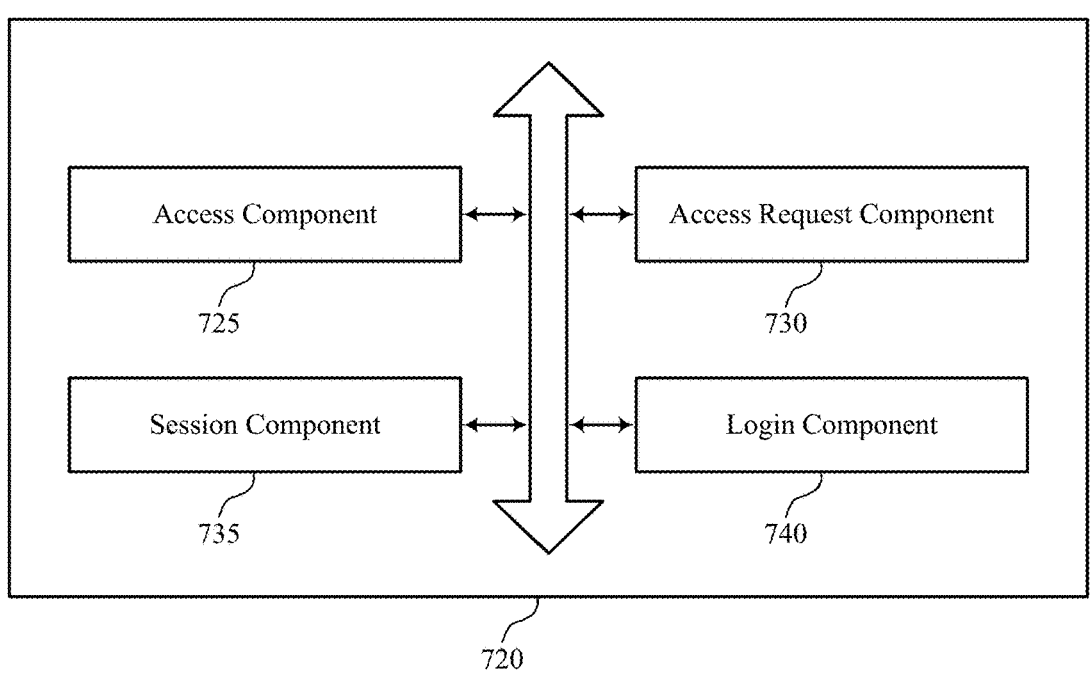
FIG. 7 shows a block diagram of a data manager that supports utilizing a device user key for access to third-party applications in accordance with aspects of the present disclosure.

FIG. 7 shows a block diagram 700 of a data manager 720 that supports utilizing a device user key for access to third-party applications in accordance with aspects of the present disclosure. The data manager 720 may be an example of aspects of a data manager or a data manager 620, or both, as described herein. The data manager 720, or various components thereof, may be an example of means for performing various aspects of utilizing a device user key for access to third-party applications as described herein. For example, the data manager 720 may include an access component 725, an access request component 730, a session component 735, a login component 740, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The access component 725 may be configured as or otherwise support a means for receiving, at a first agent (220) installed on the device for a first party, from a second agent (222) that is installed on the device for a second party, a request associated with accessing resources (104) of the second party. The access request component 730 may be configured as or otherwise support a means for sending, based on the request associated with accessing the resources of the second party, by the first agent to a service (215) of a resource management system (101) operated by the first party, a signed access request that includes a refresh token previously obtained from the service of the resource management system, where the signed access request is signed by a private key of the device, and where a public key of the device corresponding to the private key of the device is registered with the service of the resource management system. The session component 735 may be configured as or otherwise support a means for receiving, in response to the signed access request, by the first agent and from the service of the resource management system, a session token associated with accessing the resources of the second party via the second agent.

In some examples, the access component 725 may be configured as or otherwise support a means for verifying, based on receiving the request, that the request received from the second agent is signed by the second party, where the signed access request is sent to the service of the resource management system based on a signature of the second party being verified.

In some examples, the access request component 730 may be configured as or otherwise support a means for generating, based on receiving the request associated with accessing the resources of the second party, device posture information for the device. In some examples, the access request component 730 may be configured as or otherwise support a means for sending, based on generating the device posture information, the device posture information to the service of the resource management system.

In some examples, the access request component 730 may be configured as or otherwise support a means for receiving, in response to the signed access request, from the service of the resource management system, a request for the device posture information based on a sensitivity of the resources of the second party, where the device posture information is generated, and the device posture information is sent to the service of the resource management system, in response to the request for the device posture information.

In some examples, the device posture information is generated based on a request for the device posture information previously received from the service of the resource management system and cached at the device, or instructions for generating the device posture information that is stored at the device, the instructions including a set of instructions associated with the resources of the second party, or both.

In some examples, the device posture information includes a date of manufacture for the device, a type of the device, an operating system running on the device, a browser (221) running on the device, a version of the browser running on the device, biometric capabilities of the device, an indication that a security-based application is running on the device, or any combination thereof.

In some examples, the session component 735 may be configured as or otherwise support a means for sending, based on receiving the session token, the session token to the second agent for routing to the resources of the second party.

In some examples, the session component 735 may be configured as or otherwise support a means for establishing, based on sending the session token to the second agent, a connection between the device and the resources of the second party, where access to the resources of the second party is obtained based on establishing the connection.

In some examples, the access request component 730 may be configured as or otherwise support a means for generating, based on receiving the request associated with accessing the resources of the second party, an access request that includes the refresh token. In some examples, the access request component 730 may be configured as or otherwise support a means for signing, based on generating the access request, the access request with the private key of the device to obtain the signed access request, where the access request is sent to the service of the resource management system based on the access request being signed.

In some examples, the second agent is associated with establishing a virtual private network connection to the resources of the second party.

The login component 740 may be configured as or otherwise support a means for receiving user credentials at a login window displayed at the device by a first agent (220) installed on the device for a first party. In some examples, the login component 740 may be configured as or otherwise support a means for authenticating, based on receiving the user credentials, that the user credentials are valid. In some examples, the access request component 730 may be configured as or otherwise support a means for sending, as a result of the user credentials being authenticated, to a service (215) of a resource management system (101) operated by the first party, a signed access request that includes a refresh token previously obtained from the service of the resource management system, where the signed access request is signed by a private key of the device, and where a public key of the device corresponding to the private key of the device is registered with the service of the resource management system. In some examples, the session component 735 may be configured as or otherwise support a means for receiving, by the first agent in response to the signed access request, a session token associated with accessing resources of a second party. In some examples, the session component 735 may be configured as or otherwise support a means for storing, based on receiving the session token, the session token at the device.

In some examples, the access component 725 may be configured as or otherwise support a means for receiving, from a second agent (222) installed on the device for the second party, after the session token is stored at the device, a request associated with accessing resources of the second party. In some examples, the session component 735 may be configured as or otherwise support a means for sending, in response to the request associated with accessing the resources of the second party, the session token directly to the second agent, where the session token is routed, via the second agent, to the resources of the second party.

In some examples, the session component 735 may be configured as or otherwise support a means for establishing, based on sending the session token to the second agent, a connection between the device and the resources of the second party, where access to the resources of the second party is obtained based on establishing the connection.

In some examples, the access component 725 may be configured as or otherwise support a means for receiving, from a browser (221) installed on the device, after the session token is stored at the device, a request associated with accessing resources of the second party. In some examples, the session component 735 may be configured as or otherwise support a means for sending, in response to the request associated with accessing the resources of the second party, the session token directly to the browser, where the session token is routed, via the browser, to a second service (217) of the resource management system associated with authorizing access to the resources of the second party.

In some examples, the access component 725 may be configured as or otherwise support a means for accessing, based on the session token being received and validated by the second service of the resource management system, the resources of the second party.

Figure 8:
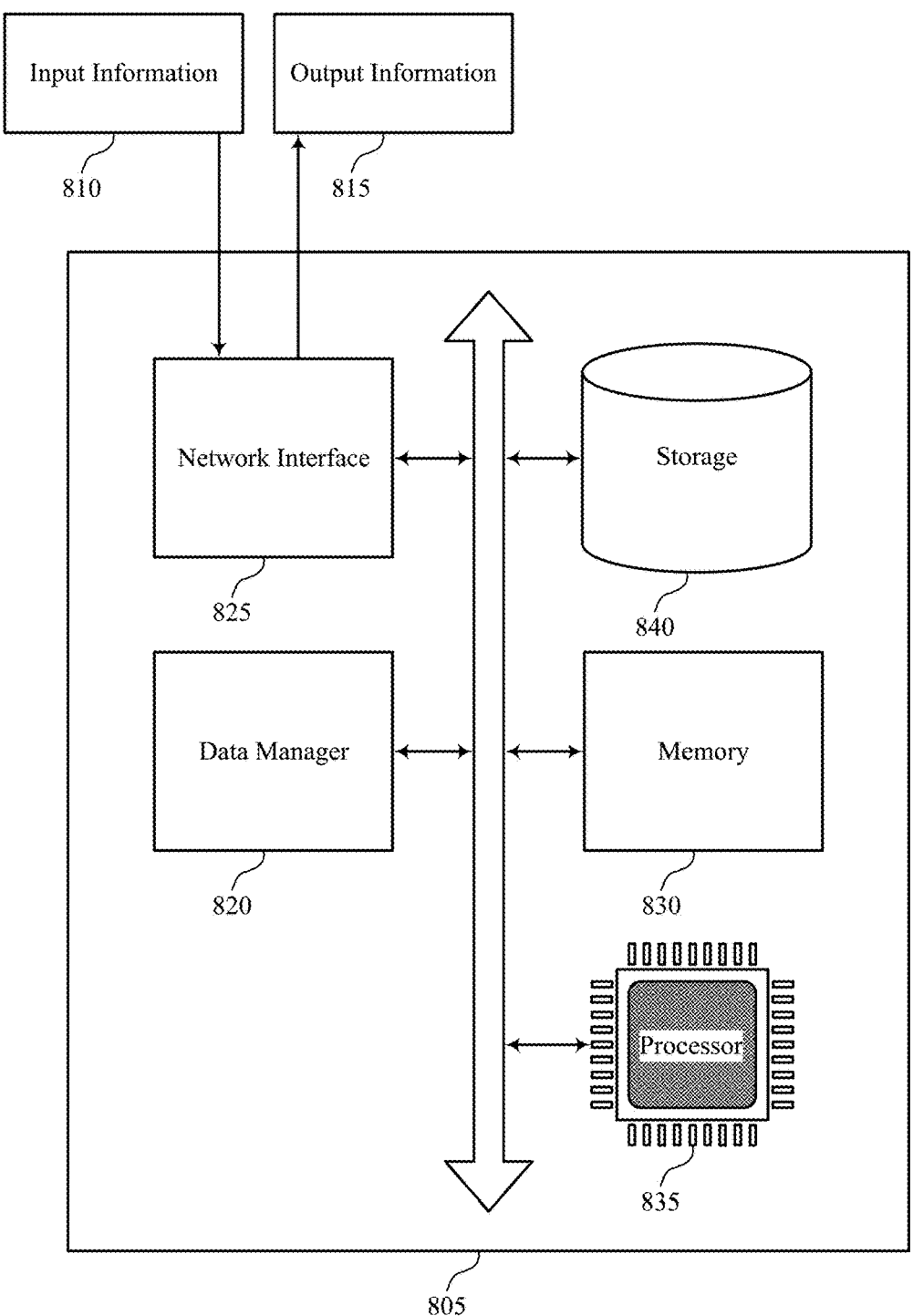
FIG. 8 shows a diagram of a system including a device that supports utilizing a device user key for access to third-party applications in accordance with aspects of the present disclosure.

FIG. 8 shows a block diagram 800 of a system 805 that supports utilizing a device user key for access to third-party applications in accordance with aspects of the present disclosure. The system 805 may be an example of or include components of a system 605 as described herein. The system 805 may include components for data management, including components such as a data manager 820, an input information 810, an output information 815, a network interface 825, at least one memory 830, at least one processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting utilizing a device user key for access to third-party applications). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

For example, the data manager 820 may be configured as or otherwise support a means for receiving, at a first agent (220) installed on the device for a first party, from a second agent (222) that is installed on the device for a second party, a request associated with accessing resources (104) of the second party. The data manager 820 may be configured as or otherwise support a means for sending, based on the request associated with accessing the resources of the second party, by the first agent to a service (215) of a resource management system (101) operated by the first party, a signed access request that includes a refresh token previously obtained from the service of the resource management system, where the signed access request is signed by a private key of the device, and where a public key of the device corresponding to the private key of the device is registered with the service of the resource management system. The data manager 820 may be configured as or otherwise support a means for receiving, in response to the signed access request, by the first agent and from the service of the resource management system, a session token associated with accessing the resources of the second party via the second agent.

For example, the data manager 820 may be configured as or otherwise support a means for receiving user credentials at a login window displayed at the device by a first agent (220) installed on the device for a first party. The data manager 820 may be configured as or otherwise support a means for authenticating, basing on receiving the user credentials, that the user credentials are valid. The data manager 820 may be configured as or otherwise support a means for sending, as a result of the user credentials being authenticated, to a service (215) of a resource management system (101) operated by the first party, a signed access request that includes a refresh token previously obtained from the service of the resource management system, where the signed access request is signed by a private key of the device, and where a public key of the device corresponding to the private key of the device is registered with the service of the resource management system. The data manager 820 may be configured as or otherwise support a means for receiving, by the first agent in response to the signed access request, a session token associated with accessing resources of a second party. The data manager 820 may be configured as or otherwise support a means for storing, based on receiving the session token, the session token at the device.

FIG. 9 shows a flowchart illustrating a method 900 that supports utilizing a device user key for access to third-party applications in accordance with aspects of the present disclosure. The operations of the method 900 may be implemented by a device or its components as described herein. For example, the operations of the method 900 may be performed by a device as described with reference to FIGS. 1 through 8. In some examples, a device may execute a set of instructions to control the functional elements of the device to perform the described functions. Additionally, or alternatively, the device may perform aspects of the described functions using special-purpose hardware.

At 905, the method may include receiving, at a first agent (220) installed on the device for a first party, from a second agent (222) that is installed on the device for a second party, a request associated with accessing resources (104) of the second party. The operations of 905 may be performed in accordance with examples as disclosed herein. In some examples, aspects of the operations of 905 may be performed by an access component 725 as described with reference to FIG. 7.

At 910, the method may include sending, based on the request associated with accessing the resources of the second party, by the first agent to a service (215) of a resource management system (101) operated by the first party, a signed access request that includes a refresh token previously obtained from the service of the resource management system, where the signed access request is signed by a private key of the device, and where a public key of the device corresponding to the private key of the device is registered with the service of the resource management system. The operations of 910 may be performed in accordance with examples as disclosed herein. In some examples, aspects of the operations of 910 may be performed by an access request component 730 as described with reference to FIG. 7.

At 915, the method may include receiving, in response to the signed access request, by the first agent and from the service of the resource management system, a session token associated with accessing the resources of the second party via the second agent. The operations of 915 may be performed in accordance with examples as disclosed herein. In some examples, aspects of the operations of 915 may be performed by a session component 735 as described with reference to FIG. 7.

FIG. 10 shows a flowchart illustrating a method 1000 that supports utilizing a device user key for access to third-party applications in accordance with aspects of the present disclosure. The operations of the method 1000 may be implemented by a device or its components as described herein. For example, the operations of the method 1000 may be performed by a device as described with reference to FIGS. 1 through 8. In some examples, a device may execute a set of instructions to control the functional elements of the device to perform the described functions. Additionally, or alternatively, the device may perform aspects of the described functions using special-purpose hardware.

At 1005, the method may include receiving user credentials at a login window displayed at the device by a first agent (220) installed on the device for a first party. The operations of 1005 may be performed in accordance with examples as disclosed herein. In some examples, aspects of the operations of 1005 may be performed by a login component 740 as described with reference to FIG. 7.

At 1010, the method may include authenticating, based on receiving the user credentials, that the user credentials are valid. The operations of 1010 may be performed in accordance with examples as disclosed herein. In some examples, aspects of the operations of 1010 may be performed by a login component 740 as described with reference to FIG. 7.

At 1015, the method may include sending, as a result of the user credentials being authenticated, to a service (215) of a resource management system (101) operated by the first party, a signed access request that includes a refresh token previously obtained from the service of the resource management system, where the signed access request is signed by a private key of the device, and where a public key of the device corresponding to the private key of the device is registered with the service of the resource management system. The operations of 1015 may be performed in accordance with examples as disclosed herein. In some examples, aspects of the operations of 1015 may be performed by an access request component 730 as described with reference to FIG. 7.

At 1020, the method may include receiving, by the first agent in response to the signed access request, a session token associated with accessing resources of a second party. The operations of 1020 may be performed in accordance with examples as disclosed herein. In some examples, aspects of the operations of 1020 may be performed by a session component 735 as described with reference to FIG. 7.

At 1025, the method may include storing, based on receiving the session token, the session token at the device. The operations of 1025 may be performed in accordance with examples as disclosed herein. In some examples, aspects of the operations of 1025 may be performed by a session component 735 as described with reference to FIG. 7.

The following provides an overview of aspects of the present disclosure:

Aspect 1: A method at a device (e.g., 113), comprising: receiving, at a first agent (e.g., 220) installed on the device for a first party, from a second agent (e.g., 222) that is installed on the device for a second party, a request associated with accessing resources (e.g., 104) of the second party; sending, based on the request associated with accessing the resources of the second party, by the first agent to a service (e.g., 215) of a resource management system (e.g., 101) operated by the first party, a signed access request that comprises a refresh token previously obtained from the service of the resource management system, wherein the signed access request is signed by a private key of the device, and wherein a public key of the device corresponding to the private key of the device is registered with the service of the resource management system; and receiving, in response to the signed access request, by the first agent and from the service of the resource management system, a session token associated with accessing the resources of the second party via the second agent.

Aspect 2: The method of aspect 1, further comprising: verifying, based on receiving the request, that the request received from the second agent is signed by the second party, wherein the signed access request is sent to the service of the resource management system based on a signature of the second party being verified.

Aspect 3: The method of any of aspects 1 through 2, further comprising: generating, based on receiving the request associated with accessing the resources of the second party, device posture information for the device; and sending, based on generating the device posture information, the device posture information to the service of the resource management system.

Aspect 4: The method of aspect 3, further comprising: receiving, in response to the signed access request, from the service of the resource management system, a request for the device posture information based on a sensitivity of the resources of the second party, wherein the device posture information is generated, and the device posture information is sent to the service of the resource management system, in response to the request for the device posture information.

Aspect 5: The method of any of aspects 3 through 4, wherein the device posture information is generated based on a request for the device posture information previously received from the service of the resource management system and cached at the device, or instructions for generating the device posture information that is stored at the device, the instructions comprising a set of instructions associated with the resources of the second party, or both.

Aspect 6: The method of any of aspects 3 through 5, wherein the device posture information comprises a date of manufacture for the device, a type of the device, an operating system running on the device, a browser (e.g., 221) running on the device, a version of the browser running on the device, biometric capabilities of the device, an indication that a security-based application is running on the device, or any combination thereof.

Aspect 7: The method of any of aspects 1 through 6, further comprising: sending, based on receiving the session token, the session token to the second agent for routing to the resources of the second party.

Aspect 8: The method of any of aspects 1 through 7, further comprising: establishing, based on sending the session token to the second agent, a connection between the device and the resources of the second party, wherein access to the resources of the second party is obtained based on establishing the connection.

Aspect 9: The method of any of aspects 1 through 8, further comprising: generating, based on receiving the request associated with accessing the resources of the second party, an access request that comprises the refresh token; and signing, based on generating the access request, the access request with the private key of the device to obtain the signed access request, wherein the access request is sent to the service of the resource management system based on the access request being signed.

Aspect 10: The method of any of aspects 1 through 9, wherein the second agent is associated with establishing a virtual private network connection to the resources of the second party.

Aspect 11: A method at a device (e.g., 113), comprising: receiving user credentials at a login window displayed at the device by a first agent (e.g., 220) installed on the device for a first party; authenticating, based on receiving the user credentials, that the user credentials are valid; sending, as a result of the user credentials being authenticated, to a service (e.g., 215) of a resource management system (e.g., 101) operated by the first party, a signed access request that comprises a refresh token previously obtained from the service of the resource management system, wherein the signed access request is signed by a private key of the device, and wherein a public key of the device corresponding to the private key of the device is registered with the service of the resource management system; receiving, by the first agent in response to the signed access request, a session token associated with accessing resources of a second party; and storing, based on receiving the session token, the session token at the device.

Aspect 12: The method of aspect 11, further comprising: receiving, from a second agent (e.g., 222) installed on the device for the second party, after the session token is stored at the device, a request associated with accessing resources of the second party; and sending, in response to the request associated with accessing the resources of the second party, the session token directly to the second agent, wherein the session token is routed, via the second agent, to the resources of the second party.

Aspect 13: The method of aspect 12, further comprising: establishing, based on sending the session token to the second agent, a connection between the device and the resources of the second party, wherein access to the resources of the second party is obtained based on establishing the connection.

Aspect 14: The method of any of aspects 11 through 13, further comprising: receiving, from a browser (e.g., 221) installed on the device, after the session token is stored at the device, a request associated with accessing resources of the second party; and sending, in response to the request associated with accessing the resources of the second party, the session token directly to the browser, wherein the session token is routed, via the browser, to a second service (e.g., 217) of the resource management system associated with authorizing access to the resources of the second party.

Aspect 15: The method of aspect 14, further comprising: accessing, based on the session token being received and validated by the second service of the resource management system, the resources of the second party.

Aspect 16: A device (e.g., 113) comprising one or more memories storing processor-executable code, and one or more processors coupled with the one or more memories and individually or collectively operable to execute the code to cause the device (e.g., 113) to perform a method of any of aspects 1 through 10.

Aspect 17: A device (e.g., 113) comprising at least one means for performing a method of any of aspects 1 through 10.

Aspect 18: A non-transitory computer-readable medium storing code the code comprising instructions executable by one or more processors to perform a method of any of aspects 1 through 10.

Aspect 19: A device (e.g., 113) comprising one or more memories storing processor-executable code, and one or more processors coupled with the one or more memories and individually or collectively operable to execute the code to cause the device (e.g., 113) to perform a method of any of aspects 11 through 15.

Aspect 20: A device (e.g., 113) comprising at least one means for performing a method of any of aspects 11 through 15.

Aspect 21: A non-transitory computer-readable medium storing code the code comprising instructions executable by one or more processors to perform a method of any of aspects 11 through 15.

It should be noted that the methods described above describe possible implementations, and that the operations and the steps may be rearranged or otherwise modified and that other implementations are possible. Furthermore, aspects from two or more of the methods may be combined.

The description herein provides examples and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method at a device, comprising:

receiving, at a first agent installed on the device for a first party, from a second agent that is installed on the device for a second party, a request associated with accessing resources of the second party;

sending, based on the request associated with accessing the resources of the second party, by the first agent to a service of a resource management system operated by the first party, a signed access request that comprises a refresh token previously obtained from the service of the resource management system, wherein the signed access request is signed by a private key of the device, and wherein a public key of the device corresponding to the private key of the device is registered with the service of the resource management system;

generating, based on the request associated with accessing the resources of the second party, device posture information for the device;

sending, based on generating the device posture information, the device posture information to the service of the resource management system;

receiving, in response to the signed access request, from the service of the resource management system, a request for the device posture information based on a sensitivity of the resources of the second party, wherein the device posture information is generated, and the device posture information is sent to the service of the resource management system, in response to the request for the device posture information; and receiving, in response to the signed access request, by the first agent and from the service of the resource management system, a session token associated with accessing the resources of the second party via the second agent.

2. The method of claim 1, further comprising:

verifying, based on receiving the request, that the request received from the second agent is signed by the second party, wherein the signed access request is sent to the service of the resource management system based on a signature of the second party being verified.

3. The method of claim 1, wherein the device posture information is generated based on:

a request for the device posture information previously received from the service of the resource management system and cached at the device, or instructions for generating the device posture information that is stored at the device, the instructions comprising a set of instructions associated with the resources of the second party, or both.

4. The method of claim 1, wherein the device posture information comprises a date of manufacture for the device, a type of the device, an operating system running on the device, a browser running on the device, a version of the browser running on the device, biometric capabilities of the device, an indication that a security-based application is running on the device, or any combination thereof.

5. The method of claim 1, further comprising:

sending, based on receiving the session token, the session token to the second agent for routing to the resources of the second party.

6. The method of claim 1, further comprising:

establishing, based on sending the session token to the second agent, a connection between the device and the resources of the second party, wherein access to the resources of the second party is obtained based on establishing the connection.

7. The method of claim 1, further comprising:

generating, based on receiving the request associated with accessing the resources of the second party, an access request that comprises the refresh token; and signing, based on generating the access request, the access request with the private key of the device to obtain the signed access request, wherein the access request is sent to the service of the resource management system based on the access request being signed.

8. The method of claim 1, wherein the second agent is associated with establishing a virtual private network connection to the resources of the second party.

9. A method at a device, comprising:

receiving user credentials at a login window displayed at the device by a first agent installed on the device for a first party;

authenticating, based on receiving the user credentials, that the user credentials are valid;

sending, as a result of the user credentials being authenticated, to a service of a resource management system operated by the first party, a signed access request that comprises a refresh token previously obtained from the service of the resource management system, wherein the signed access request is signed by a private key of the device, and wherein a public key of the device corresponding to the private key of the device is registered with the service of the resource management system;

generating device posture information for the device;

sending, based on generating the device posture information, the device posture information to the service of the resource management system;

receiving, in response to the signed access request, from the service of the resource management system, a request for the device posture information based on a sensitivity of resources of a second party, wherein the device posture information is generated, and the device posture information is sent to the service of the resource management system, in response to the request for the device posture information;

receiving, by the first agent in response to the signed access request, a session token associated with accessing the resources of the second party; and storing, based on receiving the session token, the session token at the device.

10. The method of claim 9, further comprising:

receiving, from a second agent installed on the device for the second party, after the session token is stored at the device, a request associated with accessing resources of the second party; and sending, in response to the request associated with accessing the resources of the second party, the session token directly to the second agent, wherein the session token is routed, via the second agent, to the resources of the second party.

11. The method of claim 10, further comprising:

establishing, based on sending the session token to the second agent, a connection between the device and the resources of the second party, wherein access to the resources of the second party is obtained based on establishing the connection.

12. The method of claim 9, further comprising:

receiving, from a browser installed on the device, after the session token is stored at the device, a request associated with accessing resources of the second party; and sending, in response to the request associated with accessing the resources of the second party, the session token directly to the browser, wherein the session token is routed, via the browser, to a second service of the resource management system associated with authorizing access to the resources of the second party.

13. The method of claim 12, further comprising:

accessing, based on the session token being received and validated by the second service of the resource management system, the resources of the second party.

14. A non-transitory, computer-readable medium storing code comprising instructions executable, individually or collectively, by one or more processors of a device to cause the device to:

receive, at a first agent installed on the device for a first party, from a second agent that is installed on the device for a second party, a request associated with accessing resources of the second party;

send, based on the request associated with accessing the resources of the second party, by the first agent to a service of a resource management system operated by the first party, a signed access request that comprises a refresh token previously obtained from the service of the resource management system, wherein the signed access request is signed by a private key of the device, and wherein a public key of the device corresponding to the private key of the device is registered with the service of the resource management system;

generate, based on the request associated with accessing the resources of the second party, device posture information for the device;

send, based on generation of the device posture information, the device posture information to the service of the resource management system;

receive, in response to the signed access request, from the service of the resource management system, a request for the device posture information based on a sensitivity of the resources of the second party, wherein the device posture information is generated, and the device posture information is sent to the service of the resource management system, in response to the request for the device posture information; and receive, in response to the signed access request, by the first agent and from the service of the resource management system, a session token associated with accessing the resources of the second party via the second agent.

15. The non-transitory, computer-readable medium of claim 14, wherein the instructions are executable, individually or collectively, by the one or more processors to cause the device to:

verify, based on receiving the request, that the request received from the second agent is signed by the second party, wherein the signed access request is sent to the service of the resource management system based on a signature of the second party being verified.

16. The non-transitory, computer-readable medium of claim 14, wherein the instructions are executable, individually or collectively, by the one or more processors to cause the device to:

establish, based on sending the session token to the second agent, a connection between the device and the resources of the second party, wherein access to the resources of the second party are obtained based on establishing the connection.

17. The non-transitory, computer-readable medium of claim 14, wherein the device posture information is generated based on:

a request for the device posture information previously received from the service of the resource management system and cached at the device, or instructions for generating the device posture information that is stored at the device, the instructions comprising a set of instructions associated with the resources of the second party, or both.

18. The non-transitory, computer-readable medium of claim 14, wherein the device posture information comprises a date of manufacture for the device, a type of the device, an operating system running on the device, a browser running on the device, a version of the browser running on the device, biometric capabilities of the device, an indication that a security-based application is running on the device, or any combination thereof.

19. The non-transitory, computer-readable medium of claim 14, wherein the instructions are executable, individually or collectively, by the one or more processors to cause the device to:

send, based on reception of the session token, the session token to the second agent for routing to the resources of the second party.

20. The non-transitory, computer-readable medium of claim 14, wherein the instructions are executable, individually or collectively, by the one or more processors to cause the device to:

generate, based on the request associated with accessing the resources of the second party, an access request that comprises the refresh token; and sign, based on the access request, the access request with the private key of the device to obtain the signed access request, wherein the access request is sent to the service of the resource management system based on the access request being signed.

\* \* \* \* \*